United States Patent
Psarologos et al.

(10) Patent No.: US 12,213,613 B2
(45) Date of Patent: Feb. 4, 2025

(54) LIQUID HEATING APPLIANCE FOR MAKING A BEVERAGE AND ASSOCIATED METHOD, POWER MANAGEMENT SYSTEM AND MICROCONTROLLER READABLE MEDIUM

(71) Applicant: BREVILLE PTY LIMITED, Alexandria (AU)

(72) Inventors: Con Psarologos, Alexandria (AU); Xiang Ren, Alexandria (AU); Ali Tofaili, Alexandria (AU); Scott Fryer, Alexandria (AU); Daniel Philip Machen, Alexandria (AU); Lee Man Ho Kelvin, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 830 days.

(21) Appl. No.: 17/416,463

(22) PCT Filed: Dec. 18, 2019

(86) PCT No.: PCT/AU2019/051393
§ 371 (c)(1),
(2) Date: Jun. 18, 2021

(87) PCT Pub. No.: WO2020/124143
PCT Pub. Date: Jun. 25, 2020

(65) Prior Publication Data
US 2022/0071433 A1    Mar. 10, 2022

(30) Foreign Application Priority Data
Dec. 18, 2018    (AU) .............................. 2018904809

(51) Int. Cl.
*A47J 27/21*    (2006.01)
*F24H 1/00*    (2022.01)
(Continued)

(52) U.S. Cl.
CPC ...... *A47J 27/21091* (2013.01); *F24H 1/0018* (2013.01); *G05D 23/1931* (2013.01);
(Continued)

(58) Field of Classification Search
CPC .............. A47J 27/21008; A47J 27/2105; A47J 27/21016; A47J 27/21166; A47J 31/00;
(Continued)

(56) References Cited

U.S. PATENT DOCUMENTS 4,523,083 A * 6/1985 Hamilton ............ A47J 36/2461
219/521
5,019,690 A * 5/1991 Knepler ............. G05D 23/1912
219/400

(Continued)

FOREIGN PATENT DOCUMENTS

| CN | 101086385 A | 12/2007 |
|----|-------------|---------|
| CN | 206102408 U | 4/2017 |

(Continued)

OTHER PUBLICATIONS

European Supplementary Search Report for 19898646.5 dated Jul. 22, 2022.
(Continued)

*Primary Examiner* — Chris Q Liu
(74) *Attorney, Agent, or Firm* — MOSER TABOADA

(57) ABSTRACT

A liquid heating appliance for making a beverage, the liquid heating appliance comprising: a plurality of heating components for heating a liquid, where at least a first of the plurality of heating components is powered using mains power, a power management system, wherein the power management system comprises: a controller, and an energy storage device, wherein the controller is arranged to: control an amount of the mains power applied to the first of the plurality of heating components, control an amount of stored (Continued)

power from the energy storage device to be applied to at least a second of the plurality of heating components, and switch polarity of the voltage of the stored power from the energy storage device to be applied to the second of the plurality of heating components after one or more heating cycles associated with the second of the plurality of heating components.

17 Claims, 21 Drawing Sheets

(51) Int. Cl.
| | | |
|---|---|---|
| *G05D 23/19* | (2006.01) | |
| *H02J 7/00* | (2006.01) | |
| *H05B 1/02* | (2006.01) | |
| G05D 23/24 | (2006.01) | |
| H02M 7/42 | (2006.01) | |

(52) U.S. Cl.
CPC .......... *H02J 7/0034* (2013.01); *H02J 7/0063* (2013.01); *H05B 1/0269* (2013.01); *G05D 23/2401* (2013.01); *H02J 7/0048* (2020.01); *H02J 7/0068* (2013.01); *H02M 7/42* (2013.01)

(58) Field of Classification Search
CPC ........ A47J 31/46; A47J 31/54; A47J 2202/00; A47J 27/00; A47J 27/004; A47J 27/21; A47J 31/005; A47J 31/36; A47J 36/2433; A47J 36/32; A47J 31/4421; A47J 36/2461; A47J 43/042; A47J 43/0465

USPC ............ 219/435, 400, 432, 433, 437, 445.1, 219/447.1, 519, 521

See application file for complete search history.

(56) References Cited

U.S. PATENT DOCUMENTS

| | | | |
|---|---|---|---|
| 5,026,465 | A | 6/1991 | Elyanow et al. |
| 5,558,753 | A | 9/1996 | Gallagher et al. |
| 2005/0029124 | A1 | 2/2005 | Holmes et al. |
| 2005/0284302 | A1* | 12/2005 | Levin .................... A47J 31/005 99/275 |
| 2013/0016462 | A1* | 1/2013 | Howitt ................ A47J 27/2105 361/679.01 |
| 2019/0021548 | A1* | 1/2019 | Eisner ................. A47J 36/2433 |

FOREIGN PATENT DOCUMENTS

| | | |
|---|---|---|
| CN | 108523681 A | 9/2018 |
| GB | 2536000 A | 9/2016 |
| GB | 2560176 A | 9/2018 |
| WO | WO-2006102980 A1 | 10/2006 |
| WO | WO 2010/089607 A1 | 8/2010 |

OTHER PUBLICATIONS

International Search Report dated Feb. 10, 2020 for International Application No. PCT/AU2019/051393.

* cited by examiner

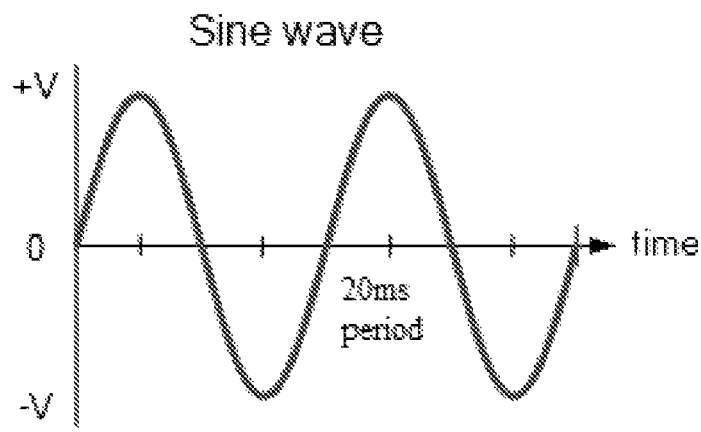
FIG 2B
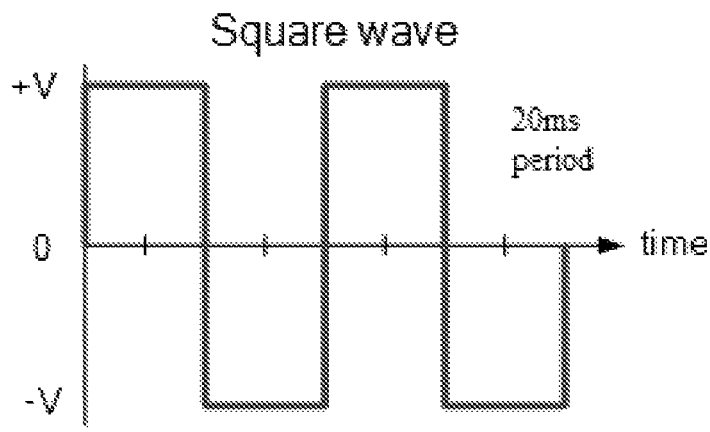
FIG 2C
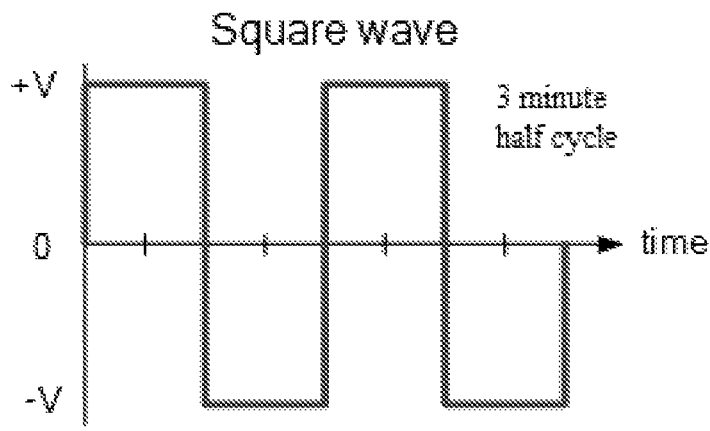
FIG 2D
FIGURES 2B – 2D

LIQUID HEATING APPLIANCE FOR MAKING A BEVERAGE AND ASSOCIATED METHOD, POWER MANAGEMENT SYSTEM AND MICROCONTROLLER READABLE MEDIUM

TECHNICAL FIELD

The present invention relates generally to a liquid heating appliance for making a beverage, a power management system for the liquid heating appliance, a method for controlling a liquid heating appliance and a microcontroller readable medium.

BACKGROUND

Standard liquid heating appliances such as kettles, coffee makers, tea makers etc., heat up water, for example, for use when making beverages using the power that is available from the main power supply to which the appliance is connected.

At times, depending on which country or location the appliance is being used, the power available via the main domestic power supply, or indeed any other provided power supply, may not be sufficient to heat the water up in what is considered to be a reasonable amount of time.

For example, in the U.S.A., the domestic mains power supply provides a power source with a maximum power output of 1800 Watts. Whereas, in Australia, the maximum power output from the domestic mains power supply is 2400 Watts. Therefore, in the U.S.A. a kettle, for example, may take a certain amount of time to boil water, or at least heat the water to a desired temperature, whereas in Australia, the same kettle may take less time to boil the water or heat the water to the desired temperature. Where a domestic mains power supply is provided having a maximum power output of 3000 Watts, the time to boil the water or reach the desired temperature may be reduced even further.

Further, ionic migration is a subset of a failure phenomenon or fatigue of printed circuit boards or any connections to the load or battery. Ionic migration is a deterioration of insulating material due to corrosion which causes a decrease in insulation resistance.

Ionic migration is electrochemical migration from which metal ions are transferred from one metal electrode or PCB track to the opposite metal electrode or track. This transfer occurs between these electrodes when an electric field is impressed in the presence of moisture, such as moisture condensation, adhering between the electrodes. Naturally an electric field is present between two electrically charged conductors. In the case of a liquid heating appliance, fluid ingression into the internal electronics is highly likely. Heating elements that are printed on a circuit board are also used to heat water in coffee machines for brewing the coffee. Elimination or reduction of ionic migration increases the lifespan of the coffee machine.

SUMMARY

It is an object of the present invention to substantially overcome, or at least ameliorate, one or more disadvantages of existing arrangements.

Disclosed are arrangements which seek to address one or more of the above problems by providing a liquid heating appliance for making a beverage, a power management system for the liquid heating appliance, a method for controlling a liquid heating appliance and a microcontroller readable medium that enable improved heating times for a liquid being heated in the liquid heating appliance.

According to a first aspect of the present disclosure, there is provided a liquid heating appliance for making a beverage, the liquid heating appliance comprising: a plurality of heating components for heating a liquid, where at least a first of the plurality of heating components is powered using mains power, a power management system, wherein the power management system comprises: a controller, and an energy storage device, wherein the controller is arranged to: control an amount of the mains power applied to the first of the plurality of heating components, control an amount of stored power from the energy storage device to be applied to at least a second of the plurality of heating components, and switch polarity of the voltage of the stored power from the energy storage device to be applied to the second of the plurality of heating components after one or more heating cycles associated with the second of the plurality of heating components.

The controller may be arranged to switch polarity of the voltage of the stored power from the energy storage device after each heating cycle associated with the second of the plurality of heating components.

The controller is may be arranged to switch polarity of the voltage of the stored power from the energy storage device after a defined period of time.

The controller may be arranged to switch polarity of the voltage of the stored power from the energy storage device by controlling the duty cycle of the switching devices.

The controller may be further arranged to delay switching on and/or off two or more of the plurality of heating components in a defined sequence.

According to yet a further aspect of the present disclosure, there is provided a power management system for use in a liquid heating appliance for making a beverage, wherein the liquid heating appliance has a plurality of heating components for heating a liquid, the power management system comprising: a controller, and an energy storage device, wherein the controller is arranged to: control an amount of the mains power applied to the first of the plurality of heating components, control an amount of stored power from the energy storage device to be applied to at least a second of the plurality of heating components, and switch polarity of the voltage of the stored power from the energy storage device to be applied to the second of the plurality of heating components after one or more heating cycles associated with the second of the plurality of heating components.

The controller may be arranged to switch polarity of the voltage of the stored power from the energy storage device after each heating cycle associated with the second of the plurality of heating components.

The controller may be arranged to switch polarity of the voltage of the stored power from the energy storage device after a defined period of time.

The controller may be arranged to switch polarity of the voltage of the stored power from the energy storage device by controlling the duty cycle of the switching devices.

The controller may be further arranged to delay switching on and/or off two or more of the plurality of heating components in a defined sequence.

According to yet a further aspect of the present disclosure, there is provided a method of controlling the provision of power in a liquid heating appliance for making a beverage, the method comprising the steps of: controlling an amount of mains power being applied to a first of a plurality of heating components in the liquid heating appliance, controlling an amount of stored power in an energy storage device integrated with the liquid heating appliance being applied to at least a second of the plurality of heating components, and switching polarity of the voltage of the stored power from the energy storage device to be applied to the second of the plurality of heating components after one or more heating cycles associated with the second of the plurality of heating components.

The method may comprise the step of switching polarity of the voltage of the stored power from the energy storage device after each heating cycle associated with the second of the plurality of heating components.

The method may comprise the step of switching polarity of the voltage of the stored power from the energy storage device after a defined period of time.

The method may comprise the step of switching polarity of the voltage of the stored power from the energy storage device by controlling the duty cycle of the switching devices.

The method may comprise the step of delaying switching on and/or off two or more of the plurality of heating components in a defined sequence.

According to yet a further aspect of the present disclosure, there is provided a microcontroller readable medium, having a program recorded thereon, where the program is configured to make a microcontroller execute a procedure to control an amount of mains power being applied to a first of a plurality of heating components in a liquid heating appliance, control an amount of stored power in an energy storage device integrated with the liquid heating appliance being applied to at least a second of the plurality of heating components, and switch polarity of the voltage of the stored power from the energy storage device to be applied to the second of the plurality of heating components after one or more heating cycles associated with the second of the plurality of heating components.

The program may be configured to make a microcontroller execute a procedure to switch polarity of the voltage of the stored power from the energy storage device after each heating cycle associated with the second of the plurality of heating components.

The program may be configured to make a microcontroller execute a procedure to switch polarity of the voltage of the stored power from the energy storage device after a defined period of time.

The program may be configured to make a microcontroller execute a procedure to switch polarity of the voltage of the stored power from the energy storage device by controlling the duty cycle of the switching devices.

The program may be configured to make a microcontroller execute a procedure to delay switching on and/or off two or more of the plurality of heating components in a defined sequence.

According to yet a further aspect of the present disclosure, there is provided a liquid heating appliance for making a beverage, the liquid heating appliance comprising: a plurality of heating components for heating a liquid, where at least a first of the plurality of heating components is powered using mains power, a power management system, wherein the power management system comprises: a controller, an energy storage device, and a switching component, wherein the controller is arranged to: control an amount of the mains power applied to the first of the plurality of heating components, and control an amount of stored power from the energy storage device to be applied to at least a second of the plurality of heating components, wherein the switching component is arranged to: convert the stored power from the energy storage device into alternating current that is out of phase with respect to the mains power being applied to the first of the plurality of heating components.

The switching component may be arranged to convert the stored power from the energy storage device into alternating current that is 180 degrees out of phase with respect to the mains power being applied to the first of the plurality of heating components.

The switching component may be an inverter, a solid-state relay or a triac.

The alternating current may be a sinusoidal alternating current or may be a square wave alternating current.

According to yet a further aspect of the present disclosure, there is provided a power management system for use in a liquid heating appliance for making a beverage, wherein the liquid heating appliance has a plurality of heating components for heating a liquid, the power management system comprising: a controller, an energy storage device, and a switching component, wherein the controller is arranged to: control an amount of the mains power applied to the first of the plurality of heating components, and control an amount of stored power from the energy storage device to be applied to at least a second of the plurality of heating components, wherein the switching component is arranged to: convert the stored power from the energy storage device into alternating current that is out of phase with respect to the mains power being applied to the first of the plurality of heating components.

The switching component may be arranged to convert the stored power from the energy storage device into alternating current that is 180 degrees out of phase with respect to the mains power being applied to the first of the plurality of heating components.

The switching component may be an inverter, a solid-state relay or a triac.

The alternating current may be a sinusoidal alternating current, or may be a square wave alternating current.

According to yet a further aspect of the present disclosure, there is provided a method of controlling the provision of power in a liquid heating appliance for making a beverage, the method comprising the steps of: controlling an amount of mains power being applied to a first of a plurality of heating components in the liquid heating appliance, controlling an amount of stored power in an energy storage device integrated with the liquid heating appliance being applied to at least a second of the plurality of heating components, and converting the stored power from the energy storage device into alternating current that is out of phase with respect to the mains power being applied to the first of the plurality of heating components.

The method may comprise the step of converting the stored power from the energy storage device into alternating current that is 180 degrees out of phase with respect to the mains power being applied to the first of the plurality of heating components.

The switching component may be an inverter, a solid-state relay or a triac.

The alternating current may be a sinusoidal alternating current or may be a square wave alternating current.

According to yet a further aspect of the present disclosure, there is provided a microcontroller readable medium, having a program recorded thereon, where the program is configured to make a microcontroller execute a procedure to control an amount of mains power being applied to a first of a plurality of heating components in a liquid heating appliance, control an amount of stored power in an energy storage device integrated with the liquid heating appliance being applied to at least a second of the plurality of heating components, and convert the stored power from the energy storage device into alternating current The switching component may be an inverter, a solid-state relay or a triac.

The alternating current may be a sinusoidal alternating current or may be a square wave alternating current.

Other aspects are also disclosed.

BRIEF DESCRIPTION OF THE DRAWINGS

At least one embodiment of the present invention will now be described with reference to the drawings and appendices, in which:

FIGS. 2B-2D show driving waveforms for heating components used in a liquid heating appliance according to the present disclosure;

DETAILED DESCRIPTION INCLUDING BEST MODE

Although the herein described embodiments relate to water heating appliances for making a beverage, it will be understood that the appliance may be used to heat up other suitable potable liquids, or mixtures of liquids, for making beverages.

The following described embodiments relate to a kettle that boils water to enable a user to make a hot beverage, such as tea, coffee or the like. It will be understood that the described components and processes may be implemented in any suitable liquid heating appliance that can be used to make a beverage, such as a coffee maker, a tea maker and the like. It will also be understood that the described components and processes may be implemented to enable liquids other than water to be heated up in the appliance, where the temperatures used to control the processes are adjusted accordingly dependent on the liquid being heated.

Figure 1A:
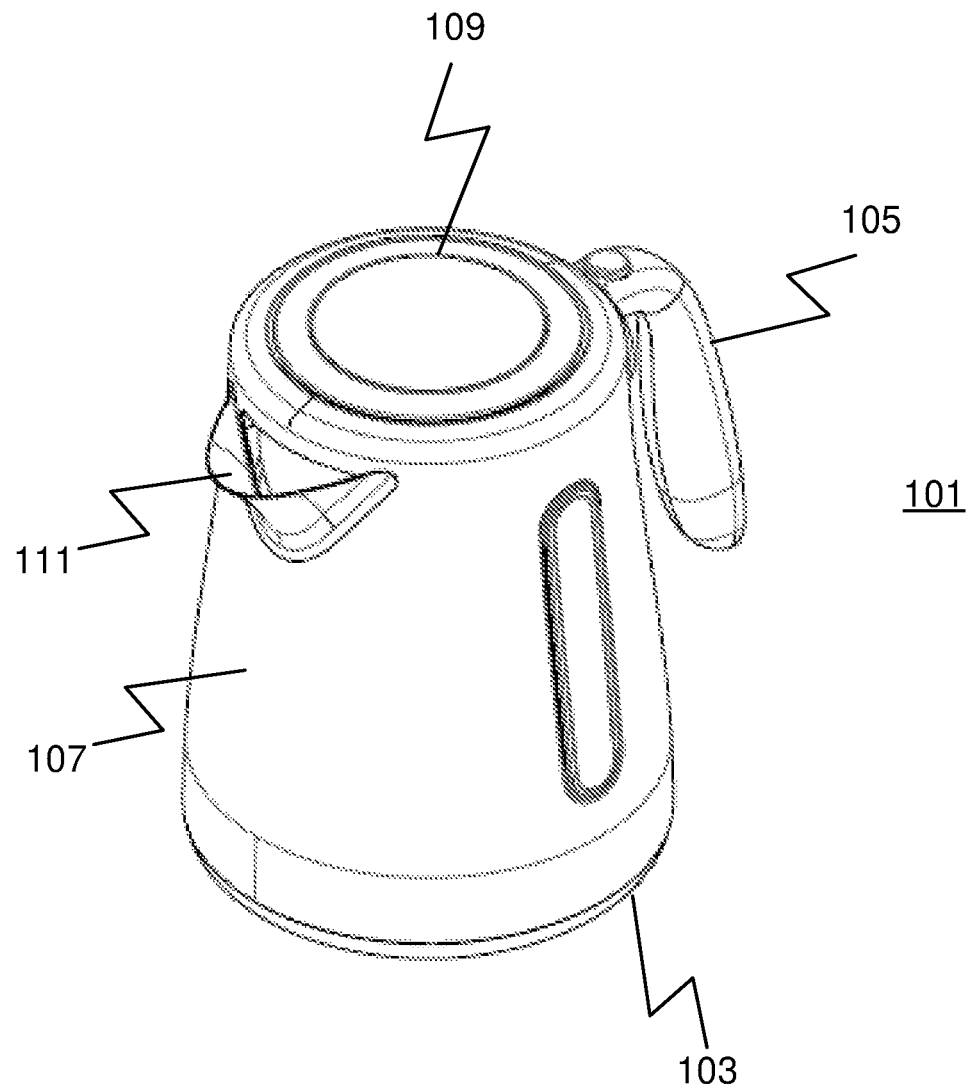
FIG. 1A shows a liquid heating appliance in the form of a kettle according to the present disclosure.

FIG. 1A shows a liquid heating appliance in the form of a kettle 101.

The kettle 101 has a base 103 through which power is provided by way of a power supply unit (not shown). A handle 105 is provided with a user interface to enable the user to control the kettle. The body 107 of the kettle forms a receptacle for holding the liquid to be heated. A lid 109 is provided to keep the majority of steam of the liquid when it is being heated inside the kettle. A spout 111 is provided to enable the heated liquid to be poured out of the receptacle.

Figure 1B:
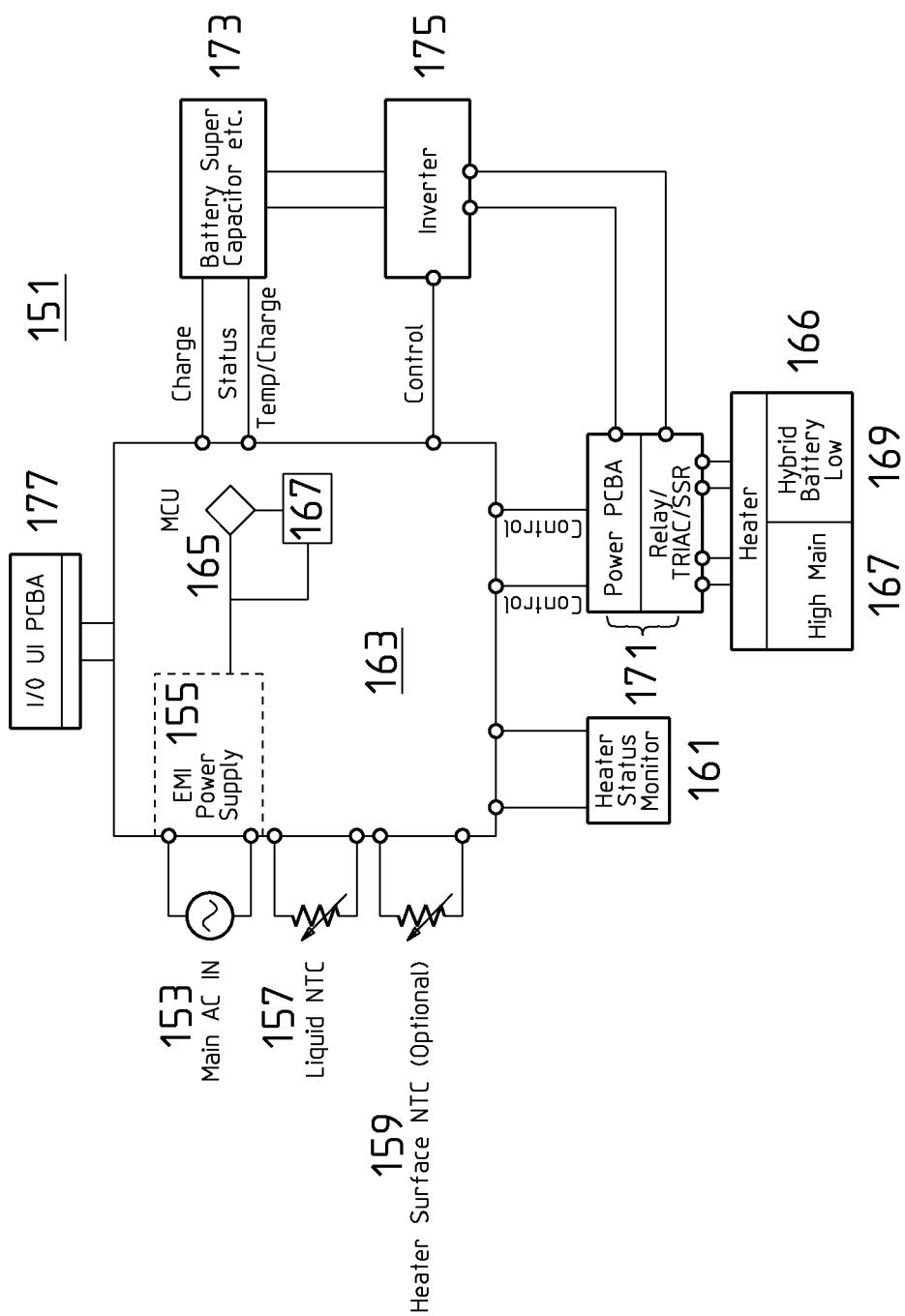
FIG. 1B shows a block diagram of a system for controlling a liquid heating appliance according to the present disclosure.

FIG. 1B shows a block diagram of a system 151 for controlling the kettle 101 when it is being used to make a beverage.

The system 151 has an AC mains power input 153 that feeds mains power to a mains power supply 155 that has EMI (Electromagnetic Interference) shielding. A first sensor 157, in the form of a negative temperature coefficient (NTC) sensor, is provided for detecting liquid temperature of the liquid being heated inside the kettle. The first sensor 157 is attached internally to the base of the kettle 101.

The liquid temperature sensor is arranged to sense a temperature of the liquid being heated by one or more of the heaters of the liquid heating appliance. The controller 165 is arranged to control the amount of power being applied to one or more of the heaters based on the sensed liquid temperature.

According to an optional example, a second sensor 159, also in the form of a negative temperature coefficient (NTC) sensor, is provided for detecting the surface temperature of a heater used to heat the liquid in the kettle 101.

The surface temperature sensor is arranged to sense a surface temperature of the main heater. The controller is arranged to control the amount of the mains power being applied to the main heater based on the sensed surfaced temperature.

A dry boil monitoring system 161 is provided. The dry boil monitoring system uses the exponential relationship between the temperature of the heater and the leakage current of the heater (the E-fast system) to provide thermal protection for the heater(s) of the kettle by determining whether the heater(s) of the kettle are switched on when there is no water inside the kettle. The leakage current may be used as an input signal to the controller to determine whether the heater(s) should be turned off to prevent damage.

A main PCBA (printed circuit board assembly) 163 is provided with a microcontroller 165 that is arranged to control the various processes based on instructions that are stored in memory 167. The memory may be, for example, a ROM or EEPROM.

Further sub systems are included as follows. A dual heater system 166 that includes a main heater 167 and a hybrid heater 169 is provided. The dual heater system 166 communicates with an electronics control system 171. The electronics control system 171 has a power PCBA, with relays and other switches (e.g. TRIACs and solid state relays) assembled thereon for control and management of the heaters (167, 169). Control lines are used to feed control signals to the power PCBA from the microcontroller 165 for the control and management of the heaters.

The main heater 167 may be considered a single heating component that may have one or more heating elements. Likewise, the hybrid heater 169 may be considered a single heating component that may have one or more heating elements. It will be understood that the liquid heating appliance may have a single main heater or multiple main heaters. Likewise, it will be understood that the liquid heating appliance may have a single hybrid heater or multiple hybrid heaters.

An energy storage device 173 is provided that has associated control circuitry that communicates with the microcontroller 165. The control lines signify, for example, a charge status of the energy storage device, or a temperature change associated with the energy storage device. The temperature change of the energy storage device may be detected by a temperature sensor, such as an infrared sensor for example.

The energy storage device and associated control circuitry may be located inside the body of the appliance, may be integrated with the body of the appliance.

According to one example, the energy storage device includes a plurality of capacitor banks and has associated with it one or more control switches, as will be explained in more detail below. According to an alternative example, the energy storage device may include one or more battery storage devices, where the device has associated with it one or more control switches. Therefore, the energy storage device may include a capacitor, a capacitor bank, a super capacitor, a super capacitor bank, or a battery. It will be understood that any suitable form of energy storage may be used.

An inverter 175 converts the direct current (DC) energy (i.e. power output) from the energy storage device into an alternating current (AC) energy (i.e. power output) which is then used to heat up the hybrid heater 169.

Alternatively, DC current could be fed directly into the heater element of the hybrid heater 169 itself.

Figure 1C:
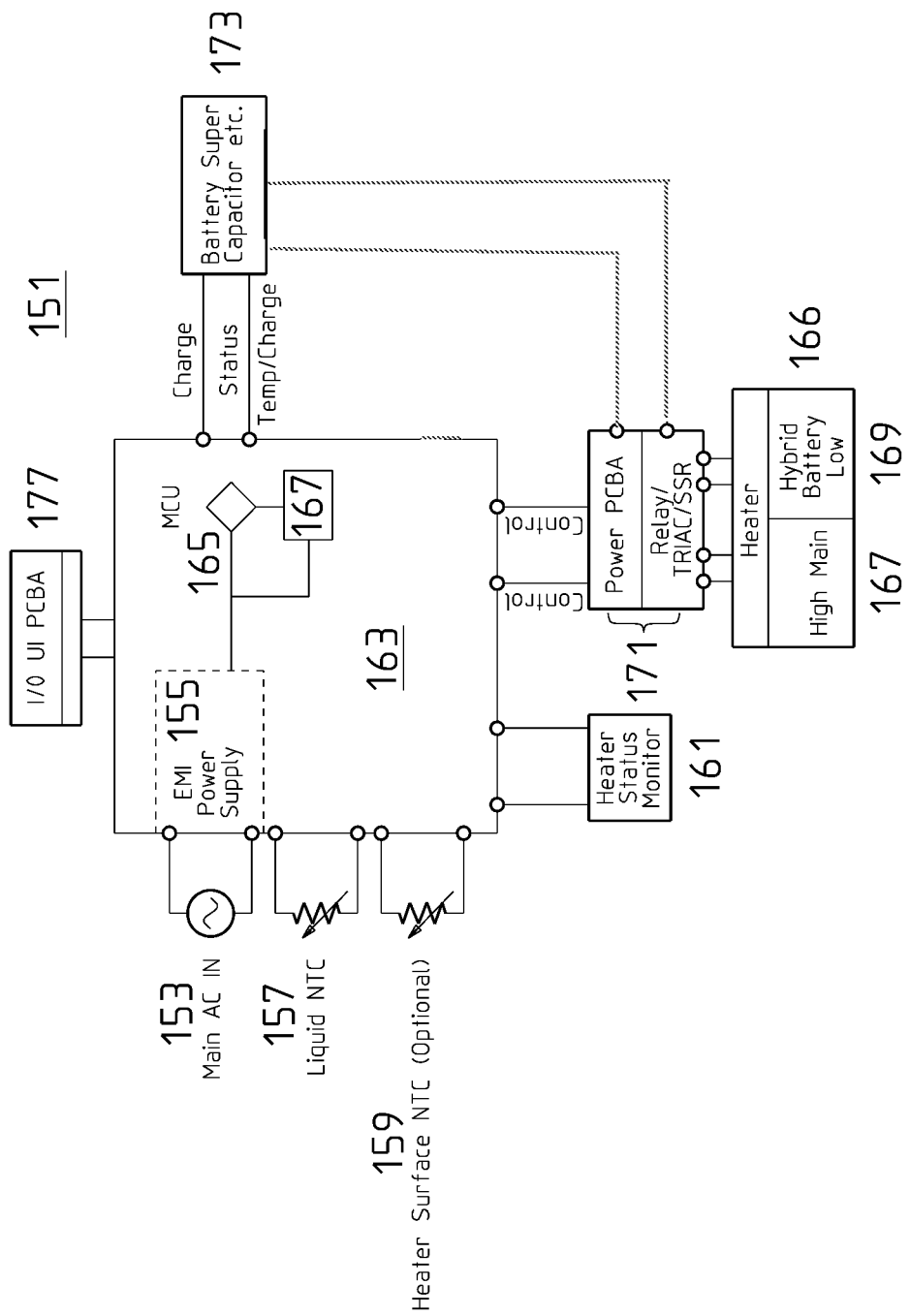
FIG. 1C shows a block diagram of a system for controlling a liquid heating appliance according to the present disclosure.

FIG. 1C shows an alternative block diagram of a system 151 for controlling the kettle 101 when it is being used to make a beverage, where DC power from the energy storage device is fed directly into the heating element of the hybrid heater. In order to reduce the risk of ionic migration between the power tracks on the heater, in this example, the controller is arranged to switch polarity of the DC power signal using the DC power from the energy storage device to be applied to the second of the plurality of heating components after one or more heating cycles of the hybrid heater. For example, the polarity may be switched after each heating cycle. Alternatively, the polarity of the DC power signal may be switched after every two, three or more heating cycles. Alternatively, the polarity of the DC power signal may be switched after a defined time period that is stored in the memory of the system, e.g. every hour, or every day.

Figure 1D:
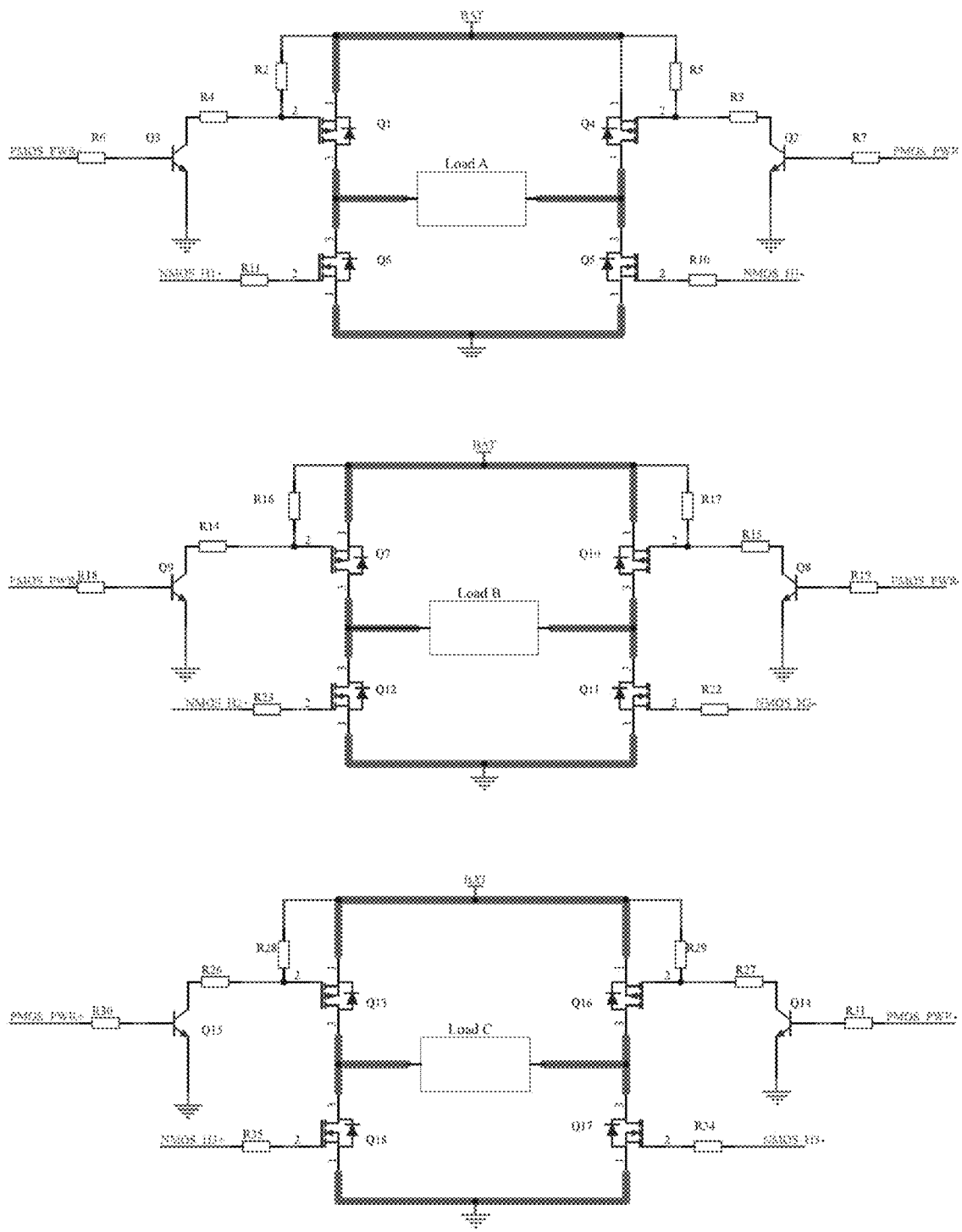
FIG. 1D shows a switching device circuit diagram according to the present disclosure.

A further embodiment is shown in FIG. 1D, in which the circuit of the appliance includes a battery, one or more DC load(s) and an electronic switch device driving circuit. The DC loads may be a heating element, a motor, a pump, coils, lights or any combination of these DC loads. The number of loads to be incorporated into the circuit depends on the capacity of battery inside the appliance.

According to one example of this embodiment, in order to minimize ionic migration, the polarity of the DC voltage applied to the load is switched (or changed) every X seconds or Y cycles.

Figure 1E:
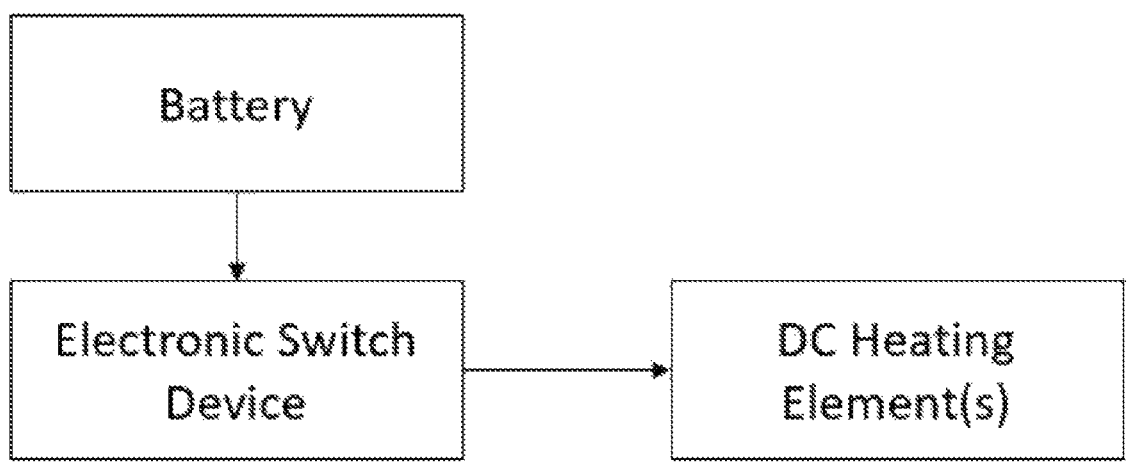
FIG. 1E shows a functional block diagram according to the present disclosure.

FIG. 1E shows an example of a suitable circuit for switching the polarity of the DC voltage on 3 different DC loads (A, B and C). Signals are received by the circuit from the microcontroller of the appliance. The circuit is powered by the energy storage device, which in this example is a battery.

Figure 1F:
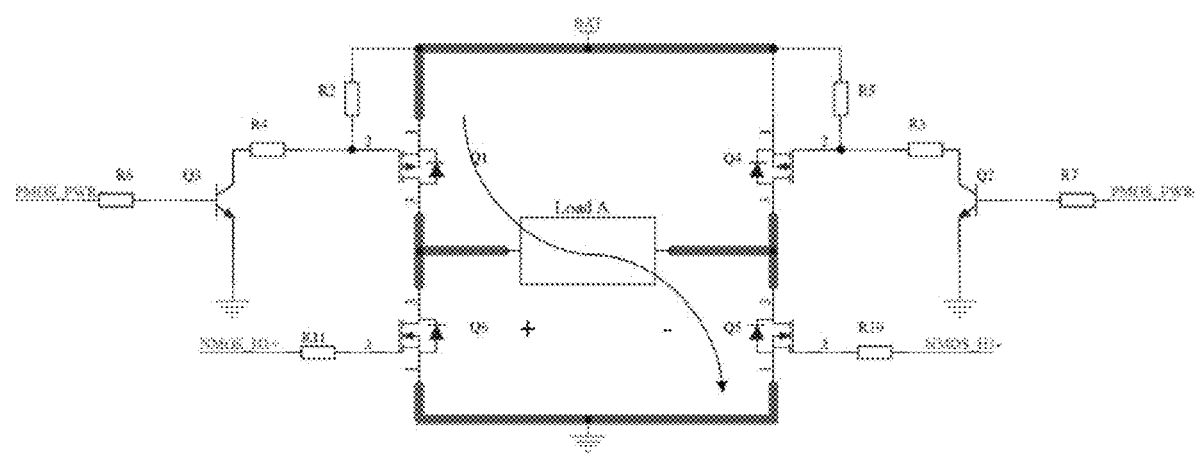
FIG. 1F shows a switching device circuit diagram in one state according to the present disclosure.

In this circuit, the conduction of switching devices Q1 and Q5 of DC load A, the conduction of switching devices Q7 and Q11 of load B and the conduction of switching devices Q13 and Q17 of load C will provide one polarity of the DC voltage on each of loads A, B and C. The forward conduction for load A is shown in FIG. 1F.

Figure 1G:
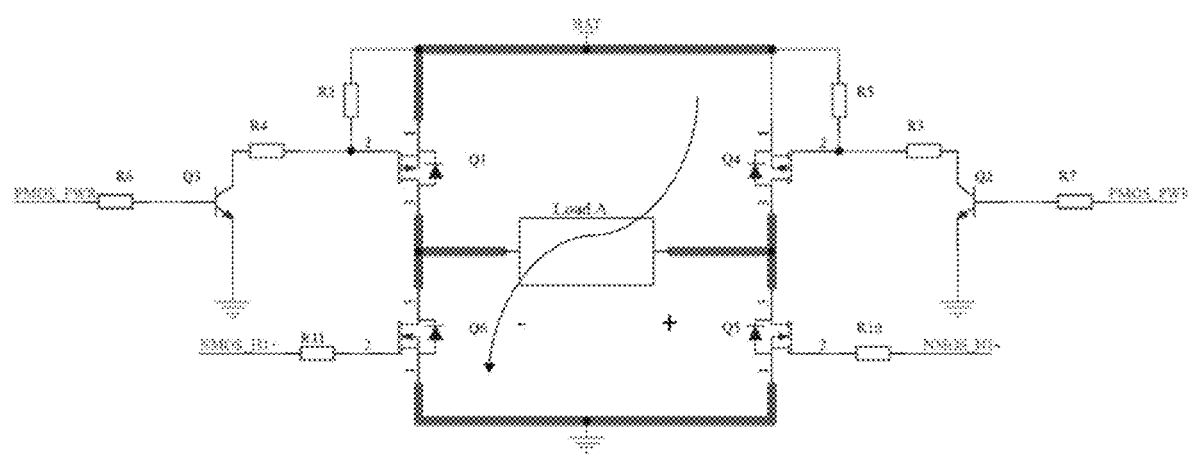
FIG. 1G shows a switching device circuit diagram in another state according to the present disclosure.

After switching devices Q1/Q7/Q13 and Q5/Q11/Q17 are switched off, switching devices Q4 and Q6 of load A, switching devices Q10 and Q12 of load B, and switching devices Q16 and Q18 of load C can be switched on, then the polarity of the DC voltage applied to each of loads A, B and C is reversed. The backward conduction for load A is shown in FIG. 1G.

Figure 1H:
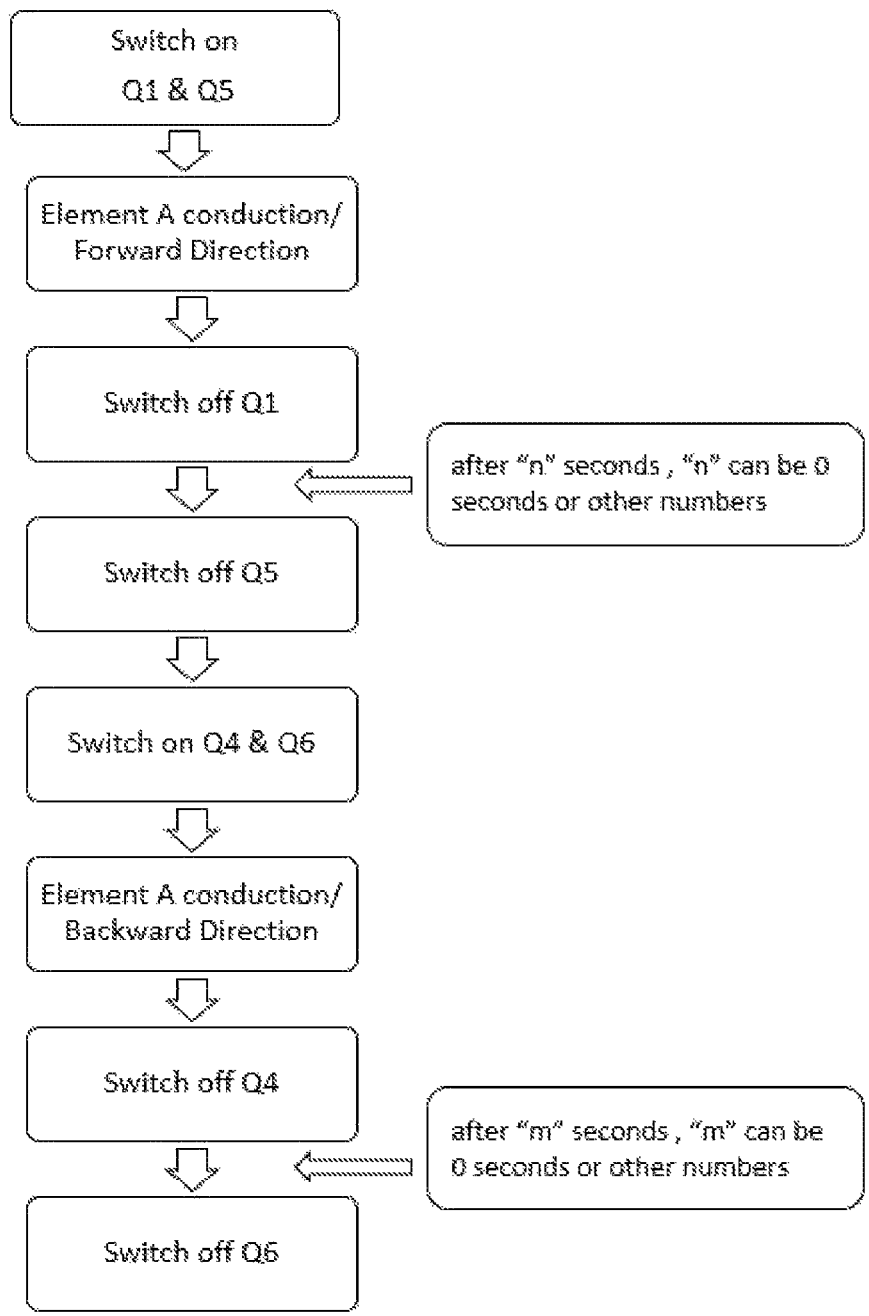
FIG. 1H shows a process flow diagram according to the present disclosure.

FIG. 1H provides a flow chart showing an example process of the operation of a load, which in this example is a heating element. In step 1101, switching devices Q1 and Q5 are switched on. In step 1103, Element A is conducting in a forward direction. In step 1105, switching device Q1 is switched off. After a defined period of time "n" seconds, where "n" may be from 0 seconds upwards. At step 1107, switching device Q5 is switched off. At step 1109, switching devices Q4 and Q6 are switched on. At step 1111, Element A is conducting in a backward direction. At step 1113, switching device Q4 is switched off. After a defined period of time "m" seconds, where "m" may be from 0 seconds upwards. At step 1115, switching device Q6 is switched off.

According to a further example, the switching of the polarity of the DC voltage may be implemented by controlling the duty cycle of the switching devices.

By turning on and off different set(s) of control signals to the electronic switching devices, the system can achieve different levels of performance.

Also, by controlling the duty cycle of the control signals applied to the electronic switching devices, the system can achieve different levels of combinations of power for better performance, such as temperature accuracy, boiling sound or motor speed.

Figure 1I:
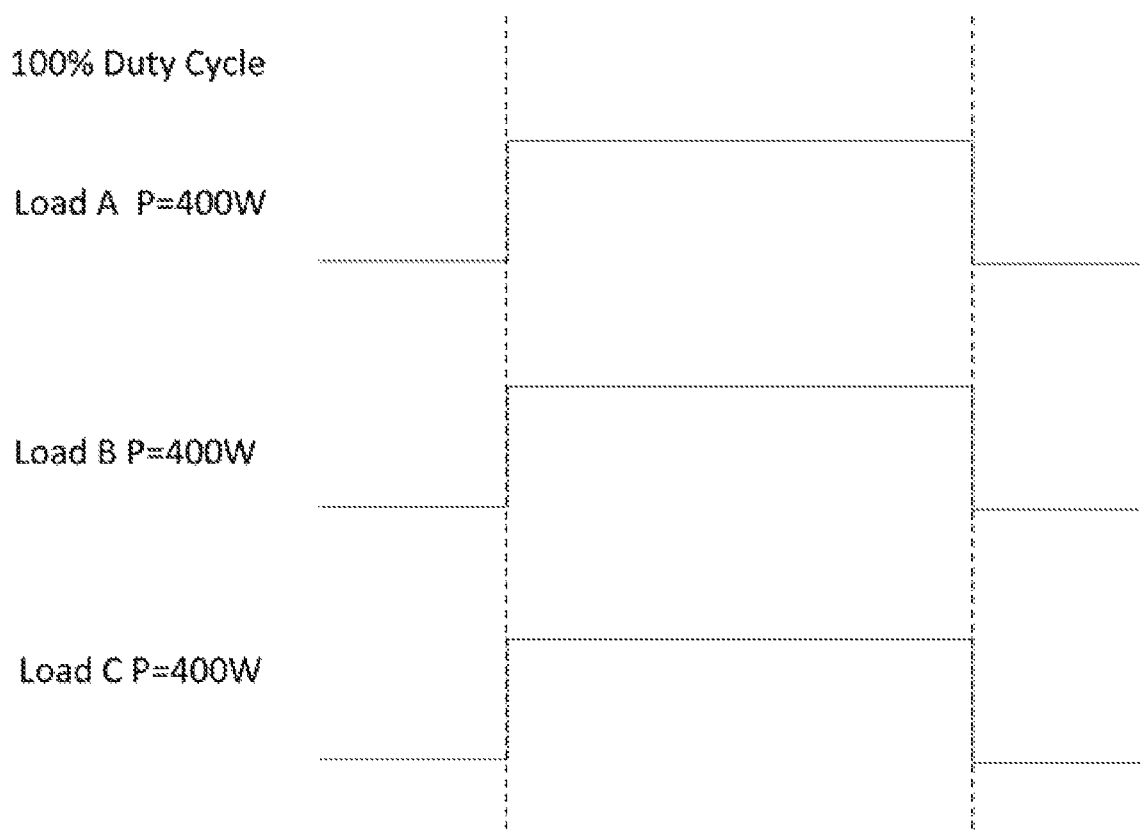
FIG. 1I shows a duty cycle diagram according to the present disclosure.
Figure 1J:
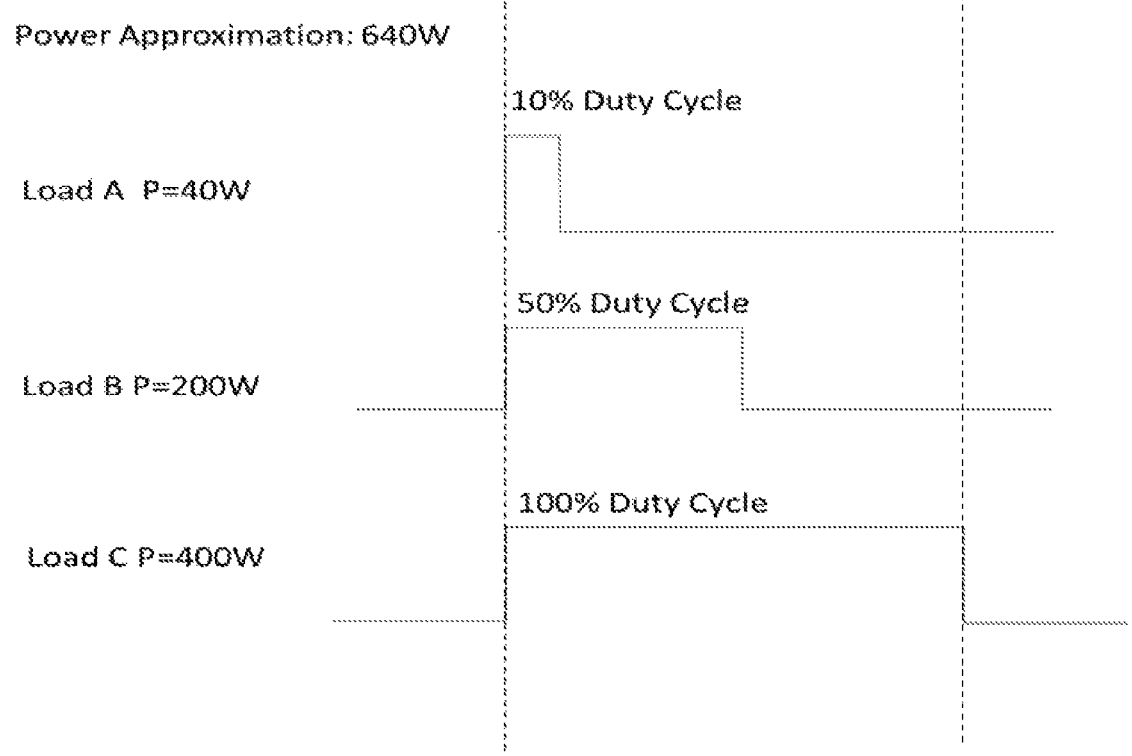
FIG. 1J shows another duty cycle diagram according to the present disclosure.

According to one example where the loads are heating elements only, as shown in FIGS. 1I and 1J, the power consumption of the heating element can be changed by controlling the duty cycle of the switching device control signals. For example, when the duty cycle of the switching device control signals is set to 100%, the total power used by the three heating elements is 1200 W. When the duty cycle of the switching device control signals is adjusted to 10% or 50%, the power used by the heating elements will change correspondingly. In the case shown in FIG. 1J, the power approximation is 640 W.

Figure 1K:
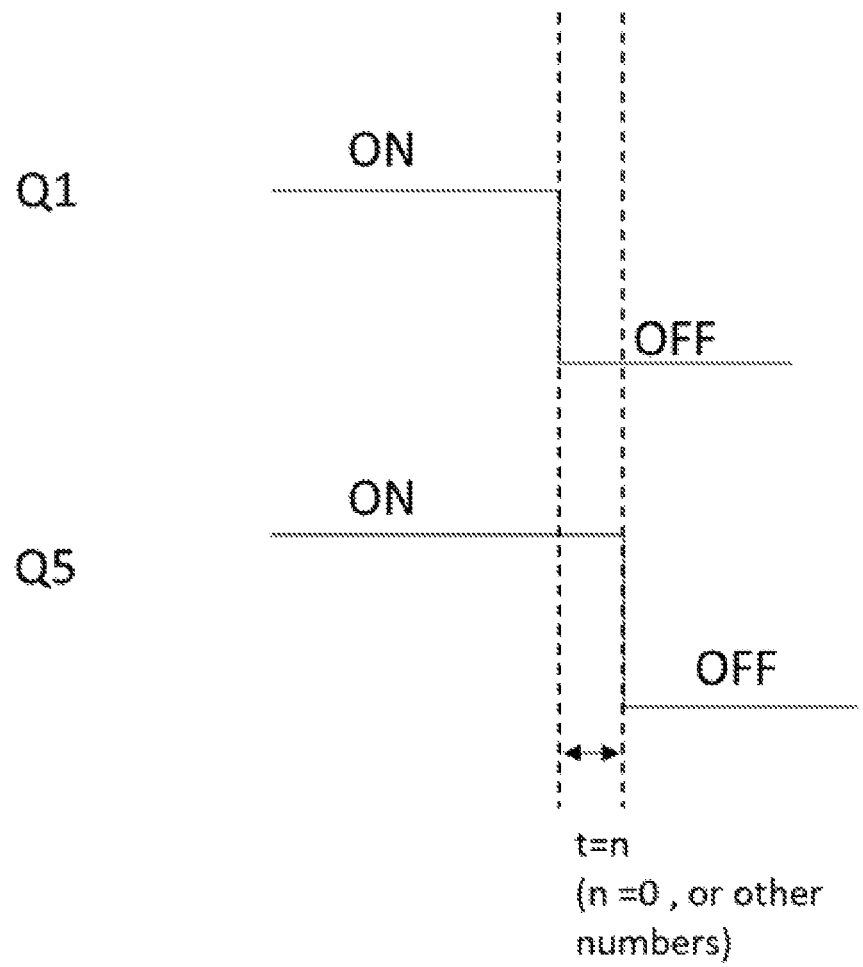
FIG. 1K shows a delay control timing diagram according to the present disclosure.

Referring to FIG. 1K, when switching the polarity of the DC voltage or turning off the DC loads, there may be a delay in switching off the switching devices Q1/Q7/13 and Q5/Q11/Q17. This delay can be 0 seconds or n seconds dependent on the load behaviour.

Figure 1L:
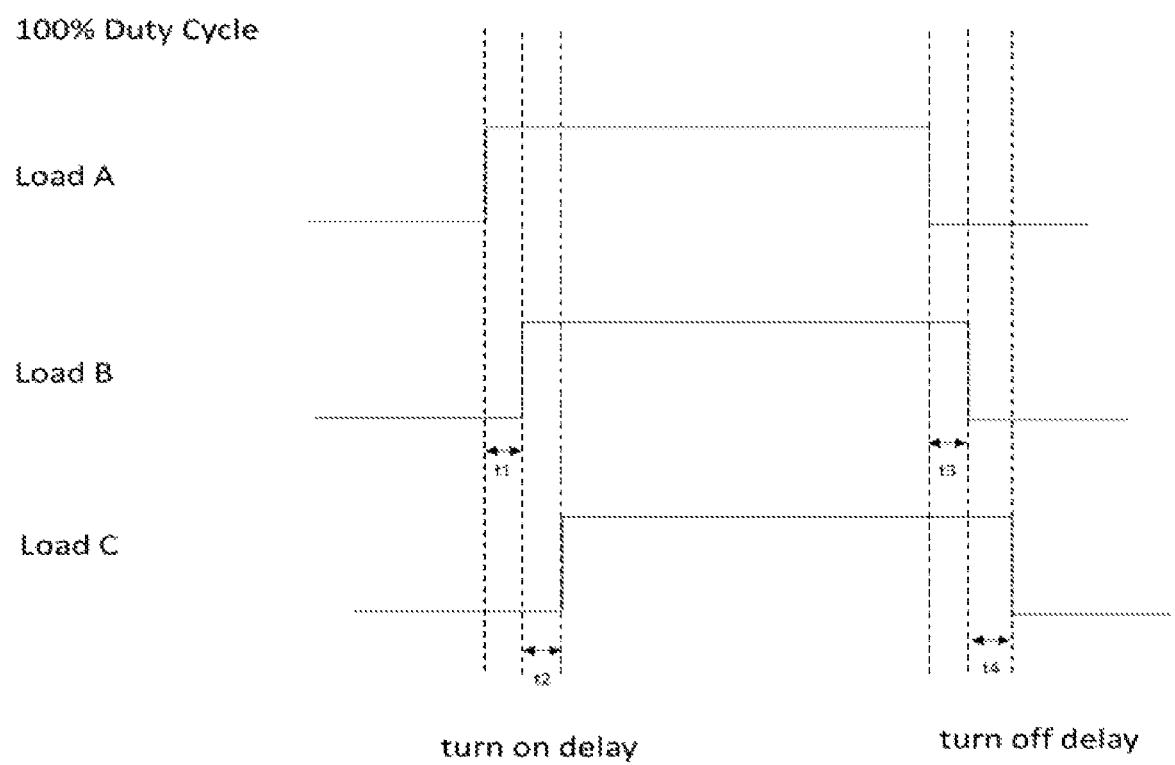
FIG. 1L shows a further delay control timing diagram according to the present disclosure.

When switching the polarity of the DC voltage again or turning off the DC loads, there may be a delay in switching off the switching devices Q4/Q10/16 and Q6/Q12/Q18. This delay can be 0 second or m seconds dependent on the load behaviour. When switching on or off the DC loads, the loads may be switched on or off at the same time. Alternatively, referring to FIG. 1L, the switching may occur in a sequence to introduce a delay between the switching on or off of each load. That is, a first load (e.g. Load A) may be switched on first, a second load (e.g. Load B) may be switched on "t1" seconds after the first load. A third load (e.g. Load C) may be switched on "t2" seconds after the second load. Also, the first load may be switched off first. The second load may be switched off "t3" seconds after the first load is switched off. The third load may be switched off "t4" seconds after the second load. It will be understood that other sequences are also envisaged. For example, the switching on sequence and switching off sequence may be in a different load order.

This introduced delay may reduce sudden changes in current in the battery and so increase the battery life.

According to another example, the DC power from the energy storage device may be converted into alternating current to reduce the ionic migration effect.

The alternating current signal that is generated by the controller may be in the form of a sinusoidal waveform, a square waveform, a triangular waveform, a trapezoidal waveform or any other suitable waveform shape or combination thereof.

The alternating current signal may be generated by the controller (under control of the software) using any suitable switching component such as, for example, an inverter, a solid state relay (SSR), a triac etc.

Therefore, according to one example, an AC sinusoidal waveform may be generated using a solid state relay (SSR) to generate a 50 hz trapezoidal waveform.

In one example, the switching operation would not be under power (i.e. the switching terminals are not live when the switching), and so low cost passive switching components may be used.

Other methods of minimizing silver migration may include the use of resistors that contain Ruthenium Oxide, or the addition of Palladium.

According to a further example, a 50 Hz square waveform may be generated using any suitable switching device, such as a solid state relay (SSR).

FIGS. 2B to 2D show three different example waveforms that may be used to drive a heating element in a multiple heating element system in a liquid heating appliance.

FIG. 2B shows a sinusoidal waveform generated by the controller (under operation of the software) using a switching device (e.g. an inverter or SSR) based on the DC power available from the energy storage device.

FIG. 2C shows a square waveform generated by the controller (under operation of the software) using a switching device (e.g. an inverter or SSR) based on the DC power available from the energy storage device. In this example, the square wave is generated to have the same time period as the mains power being applied to the other heater element, but is 180 degrees out of phase with reference to the mains power signal. It will also be understood that the square wave may be in phase with the mains power signal.

FIG. 2D shows an alternative square waveform generated by the controller (under operation of the software) using a switching device (e.g. an inverter or SSR) based on the DC power available from the energy storage device. In this example, the square wave is generated to have a different time period (e.g. 3 minutes) to the mains power being applied to the other heater element, but is 180 degrees out of phase with reference to the mains power signal. It will also be understood that the square wave may be in phase with the mains power signal.

A user interface (UI) PCBA 177 is connected to the main PCBA 163 to communicate input and output signals between the main PCBA 163 and the user interface of the kettle. For example, one or more control signals may be generated at the UI when a user selects a particular mode of operation. This control signal(s) is communicated back to the main PCBA 163 to the controller 165 to enable the controller 165 to control the various components of the system dependent on the generated control signal(s).

Figure 2A:
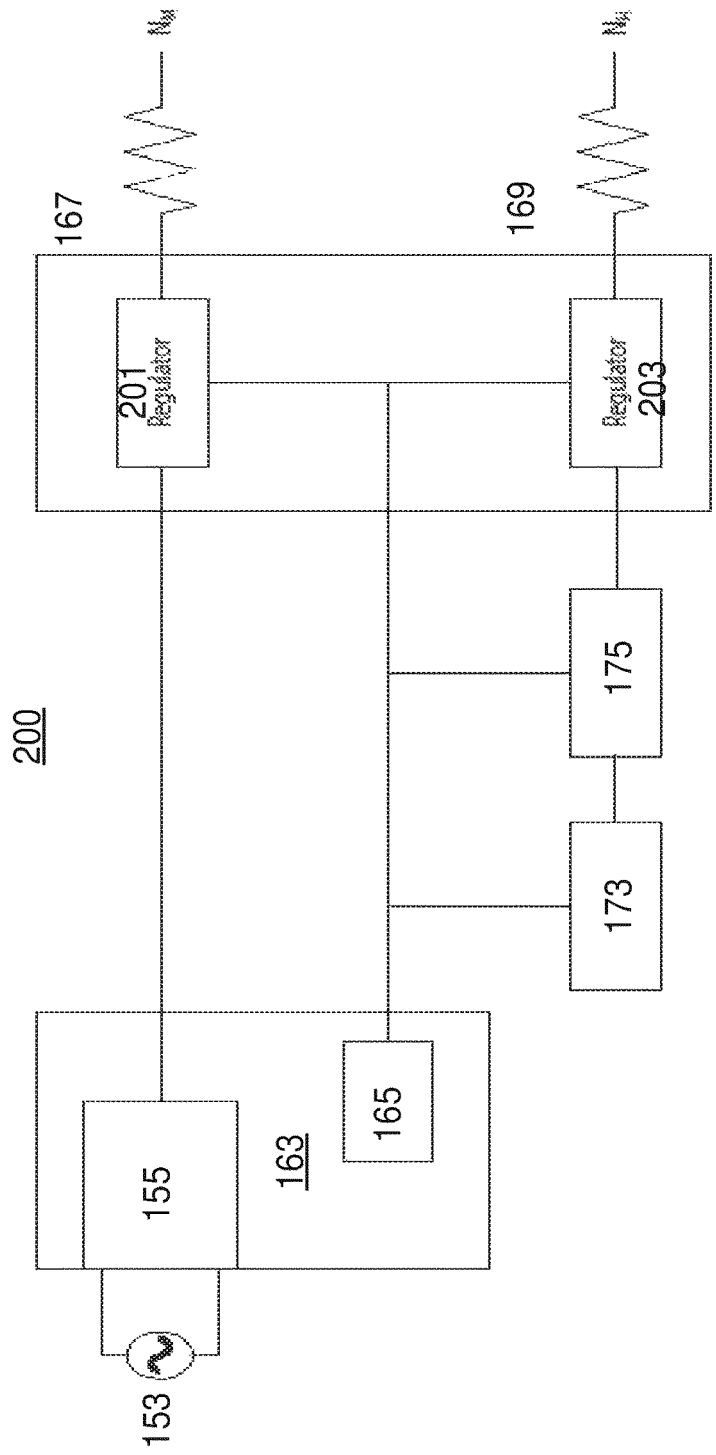
FIG. 2A shows a block diagram of a power management system for controlling a liquid heating appliance according to the present disclosure.

FIG. 2A shows a block diagram of a power management system 200 forming part of the system as described with reference to FIG. 1B for controlling a liquid heating appliance.

The power management system 200 uses the controller 165 to control the amount of power being applied to each of the heaters (167, 169) by controlling power regulator 201 (for the main heater 167) and power regulator 203 (for the hybrid heater 169) via control lines between the regulators (201, 203) and the controller 165. Control lines are connected (as also shown in FIG. 1B) between the controller 165 and the energy storage device 173 and inverter 175. Each power regulator is arranged to regulate how much power of the alternating current power provided is applied to the respective heaters.

According to a mode of operation, when the appliance is not being used to heat a liquid, e.g. it is in standby mode, the energy storage device is charged up under control of the controller 165. Control signals are fed back to a display on the UI to inform the user of the percentage of the charge of the energy storage device.

According to another mode of operation, under control of the controller 165, the main heater 167 draws power from the mains power supply by the power management system via the power regulator 201. In this mode, the hybrid heater 169 does not draw any power from the energy storage device. According to one example, 100% of available power is drawn from the mains by the main heater 167 to heat the main heater 167.

According to another mode of operation, under control of the controller 165, power from the energy storage device may be used to heat up the hybrid heater 169 at the same time as the main heater 169 is being heated up also under control of the controller 165. The controller 165 prevents the energy storage device from being charged during this mode. The controller 165 activates both heating circuits (main and hybrid) in this mode. The AC mains input provides power to the main heater 167 while the energy storage device provides power to the hybrid heater 169.

Figure 3A:
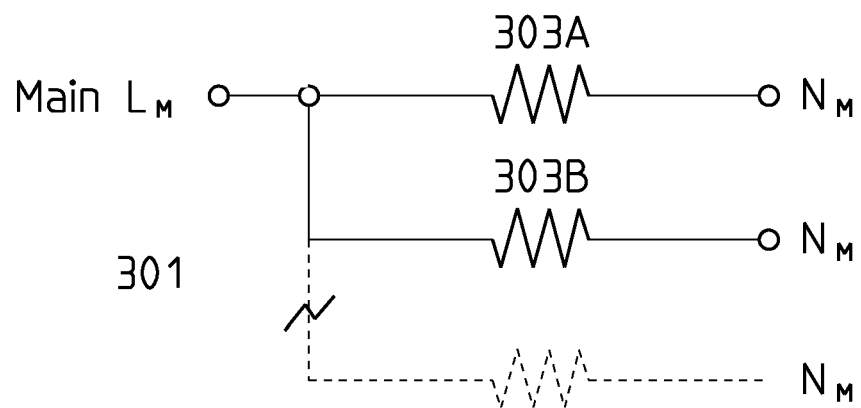
FIGS. 3A and 3B show heater wiring circuits for heating components used in a liquid heating appliance according to the present disclosure.
Figure 3B:
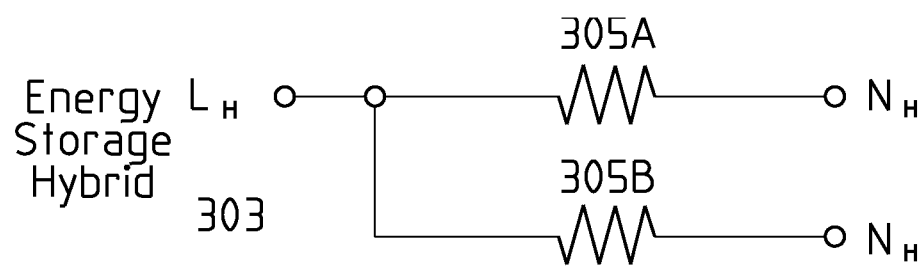

FIGS. 3A and 3B show heater wiring circuits that may be used for the main heater 167 and hybrid heater 169 in a liquid heating appliance.

FIG. 3A shows the heater wiring circuit 301 for the main heater 167. One or more heating components (303A, 303B etc.), e.g. heating elements, are provided for the main heater 167. The heating components in this example are resistive heating components. A first end of each heating component for the main heater 167 is connected to the incoming mains power live terminal. A second end of each heating component for the main heater 167 has a mains neutral connection (Nm) that is common to all heating components for the main heater 167. By selectively turning on individual heating components, the amount of power applied to the main heater 167 as a whole can be controlled. Alternatively, the controller 165 may control the amount of power applied to one or more of the heating components via control signals applied to the regulator 201.

FIG. 3B shows the heater wiring circuit 303 for the hybrid heater 169. One or more heating components (305A, 305B etc.), e.g. heating elements, are provided for the hybrid heater 169. The heating components in this example are resistive heating components. A first end of each heating component for the hybrid heater 169 is connected to the live terminal of the inverter or DC power supply 175 that is connected to the energy storage device 173. A second end of each heating component (305A, 305B) has a hybrid neutral connection (NH) that is common to all heating components for the hybrid heater 169. By selectively turning on individual heating components, the amount of power applied to the hybrid heater 169 as a whole can be controlled.

Therefore, it can be seen that there are two separate heating circuits for the main heater 167 and hybrid heater 169. Each of the main heater and hybrid heater has a set of one or more heating elements or components. Each set of heating elements or components is arranged to operate using a different voltage source.

According to one example, the main heater 167 may have a maximum power rating of 1800 watts and the hybrid heater 169 may have a maximum power rating of 600 watts. In this example, each of the main heater and hybrid heater may have a single heating element. In another example, one or both of the main heater and hybrid heater may have more than one heating element.

Figure 4:
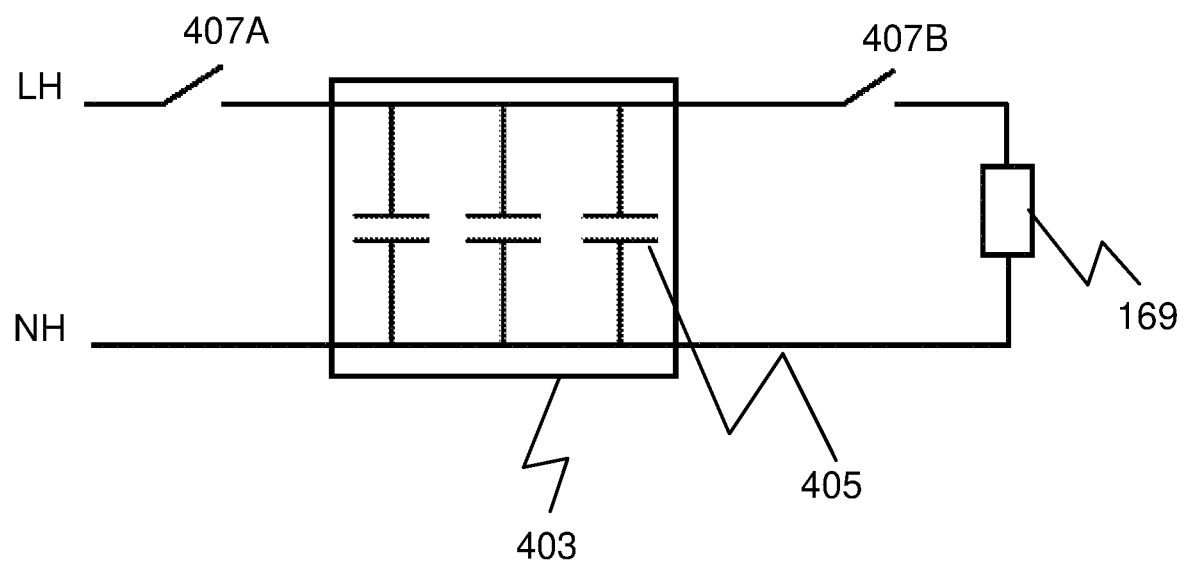
FIG. 4 shows an example of an energy storage system for use with a liquid heating appliance according to the present disclosure.

FIG. 4 shows an example of an energy storage system 401 for use with a liquid heating appliance.

As mentioned, herein, any suitable forms of energy storage may be used to form the energy storage device 173. In this example, the energy storage system 401 includes an energy storage device 173 that utilises capacitors as these have a faster rate of charge and discharge when compared to battery technology.

A circuit is shown with a capacitor bank 403 having a plurality of capacitors 405 arranged in parallel, and control switches (407A, 407B) to supply additional current for the hybrid heater 169. One or more of the capacitors may be super-capacitors.

A first switch 407A is controlled by the controller 165 to charge the bank of capacitors. A second switch 407B is controlled by the controller to discharge the bank of capacitors into, i.e. apply power to, the load (the hybrid heater 169). The switches (407A, 407B) are controlled by the controller 165 using an XOR (exclusive OR) operation to ensure that both switches are never open or closed at the same time.

It can therefore be seen that the controller is arranged, during a first mode of operation, to enable the energy storage device to be charged from the mains power. Also, it can be seen that the controller is arranged, during a second mode of operation, to enable the energy storage device to apply the stored power to the hybrid heater. The hybrid heater being one of multiple heating components in the appliance.

Further, it can be seen that in the second mode, the controller may also be arranged to determine whether the amount of power stored in the energy storage device is above a defined threshold value, where that defined threshold value has been stored in factory settings, for example. If the controller makes a positive determination that the amount of power stored in the energy storage device is above the defined threshold value, the controller may enable the energy storage device to apply the stored power to the hybrid heater.

Figure 5:
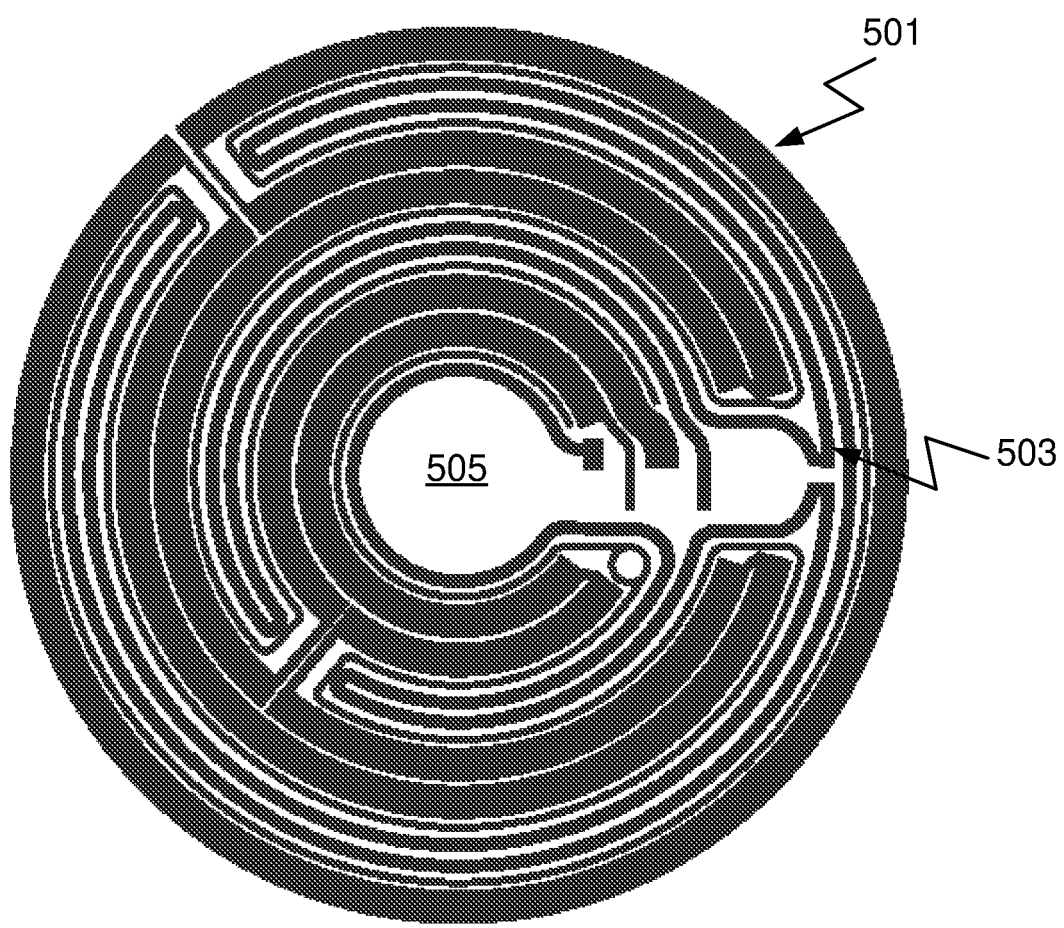
FIG. 5 shows an arrangement of heater wiring circuits and an energy storage system for use with a liquid heating appliance according to the present disclosure.

FIG. 5 shows an arrangement of heater wiring circuits and an energy storage system for use with a liquid heating appliance. This arrangement shows how the main heater elements 501 or components are interleaved with the hybrid heater elements 503 or components within the base 505 of the appliance.

Figure 6:
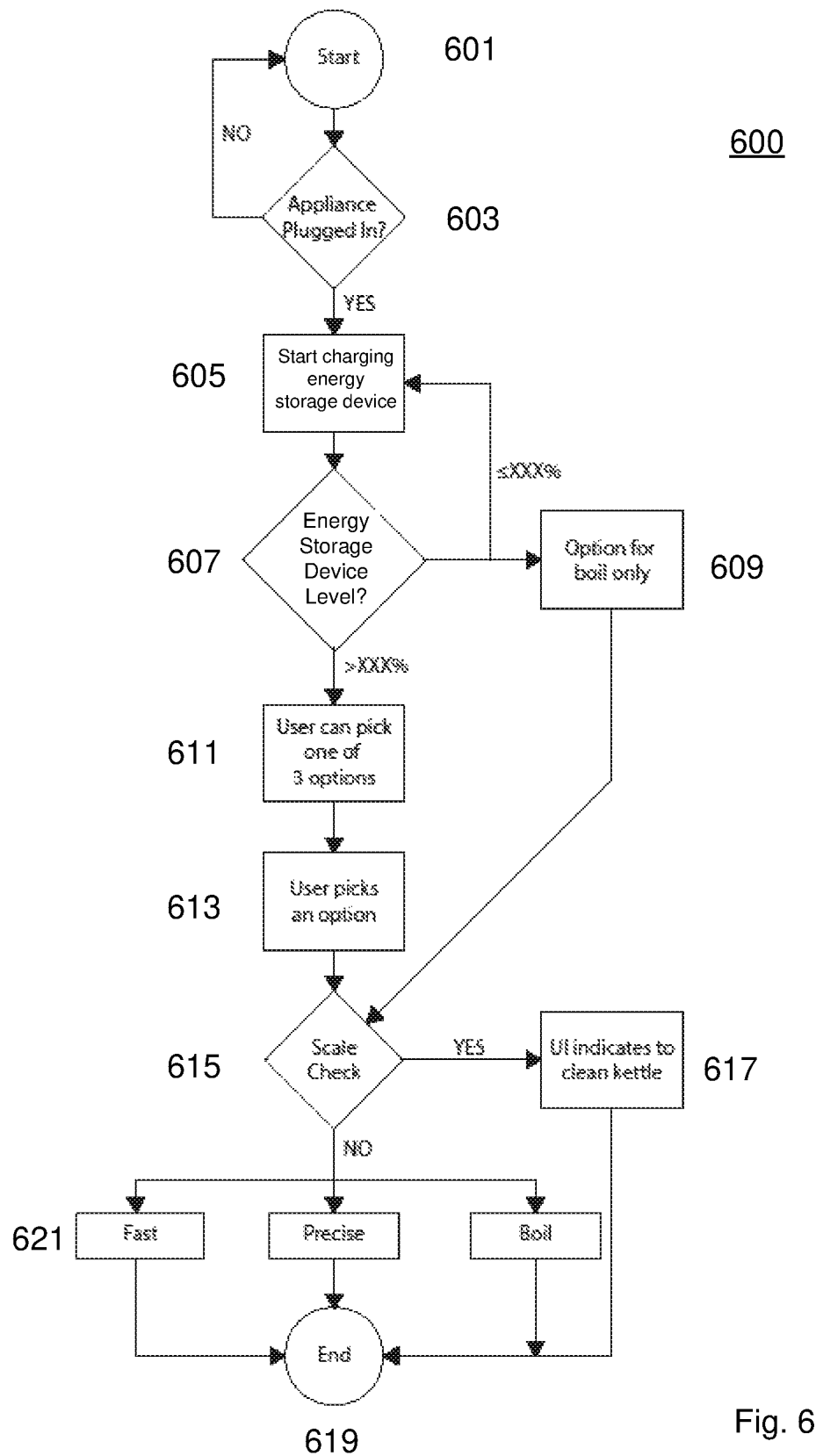
FIG. 6 shows a process flow diagram for use in a liquid heating appliance according to the present disclosure.

FIG. 6 shows a process flow diagram 600 for use in a liquid heating appliance.

The process starts at step 601. The controller initially checks to determine whether the appliance is powered by the mains power source at step 603. When the controller determines that power is connected, subsequently, the energy storage device is charged at step 605.

The controller runs an energy storage device charge level test at step 607 to determine if the energy storage device charge level is at or above a pre-determined threshold charge level at step 607. For example, the predetermined threshold charge level may be programmed to be 40% of a maximum charge level enabling the energy storage device to be used even when it is not fully charged. If the controller determines that the energy storage device is below the predetermined threshold charge level (e.g. below 40% of a maximum charge level), then the controller controls the UI of the appliance to ensure that one water heating mode is, or a limited number of heating modes are, made available to the user for selection on the UI at step 609. In this example, a single water heating mode "Standard Boil" is made available at step 609, where this mode is described below with reference to FIG. 7C. The controller continues to charge the energy storage device at step 605 until a user picks an available mode option using the UI.

When the controller determines from the energy storage device charge level test that the charge level of the energy storage device is above 40% of a maximum charge level, the controller controls the UI of the appliance to enable other water heating modes to be made available for selection by the user on the UI as shown at step 611. These heating modes include "Standard Boil", "Fast to Boil" and "Fast and Precise" as described below with reference to FIGS. 7A-7C. It will be understood that the threshold minimum charge level may be greater or less than 40%, such as 20%, 30%, 50%, 60%, 70% etc., as well as any values there-between.

At step 613, the user selects a mode option using the UI. At step 615, the controller initiates a scale check process to determine whether the appliance should be cleaned to remove excess scale. If the controller determines that scale is present, a control signal is sent to the UI to indicate on the display at step 617 to the user that the appliance should be cleaned. Further, the appliance does not initiate the mode of heating selected by the user at step 613, but instead ends the process and places the appliance back into standby mode and the process ends at step 619. The scale check is performed by the controller after the user has selected an option at step 613 because the main heater needs to be heated in order for the controller to perform the scale check. If there is scale on the main heater, then the scale will act as a blanket and the liquid NTC temperature will be substantially different from the heater Surface NTC and so will likely affect how the selected heating mode operates.

If the controller determines that scale is not present, the appliance heats up the water at step 621 using the mode chosen at step 613 (e.g. "Standard Boil", "Fast to Boil" or "Fast and Precise") and then, when completed, places the appliance back into standby mode and the process ends at step 619.

Figure 7:
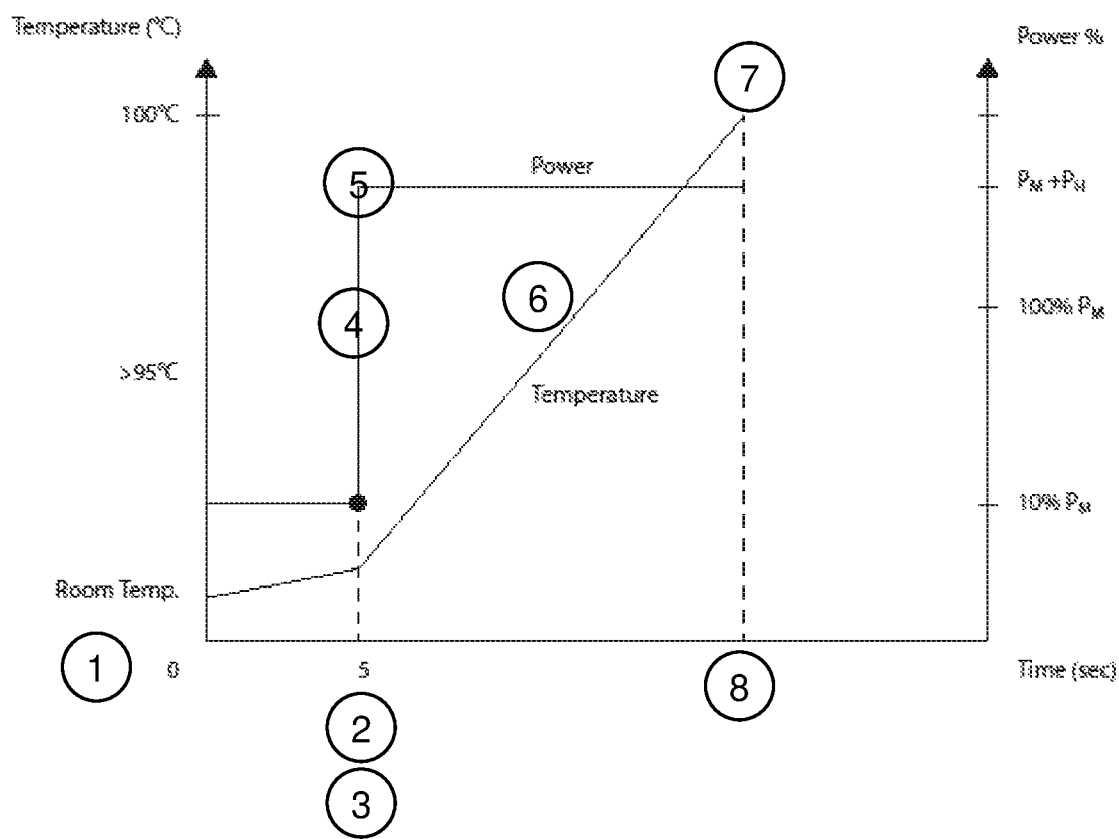
FIG. 7 shows a heating process profile according to an example in the present disclosure.

FIG. 7 shows a heating process profile termed "Fast to Boil" that is controlled by the controller when this mode of operation is selected by a user at step 613 in the process shown in FIG. 6. This process provides the user with a liquid heating option that heats the liquid to a desired temperature as fast as possible.

It will be understood that the desired temperature may be a single temperature value programmed into the controller, e.g. a value that is close to or at boiling point, e.g. 100 degrees Celsius. It will also be understood that, as an alternative, the desired temperature may be set by the user using the UI of the appliance. In this alternative, the desired temperature value may, after being selected by the user, be stored in memory for the controller to read and use in order to determine whether the desired temperature of the liquid has been reached based on the measured temperature of the water.

The process in FIG. 7 is described with reference to the following process steps. Each step described below is indicated as a number in a circle on FIG. 7.

STEP 1: The controller for checking initial conditions and test purposes, applies a defined percentage of power to the main heater 167 at a percentage level much lower than that applied when heating the liquid. For example, the power applied during a test may be set at 10% of the maximum power used to heat a liquid using the appliance. It will be understood that other lower or higher percentage values may be used, such as 5%, 6%, 7%, 8%, 9%, 11% etc. The low level power applied during this test period is for a defined period of time, e.g. 5 seconds.

Between these 0 to 5 seconds, a dry boiling prevention test, by virtue of the E-fast leakage current in the heating assembly, is detected by the controller to see if the appliance is being used without sufficient liquid being placed within it. The leakage current provides for digital detection of whether there is dry boiling, or not.

STEP 2: After a sample of 5 seconds, if the optional heater Surface NTC temperature sensor is available, heater surface temperature is determined and is used instead of, or in addition to the E-fast leakage current to determine if dry boil is occurring. If the heater Surface NTC temperature is $\Delta T < 130°$ C. then no dry boiling is flagged.

In one embodiment, the Liquid NTC is used to detect dry boiling, however because there is time lag for heat to transfer from the heating element to the Liquid NTC, dry boiling detection and flagging is not as fast and efficient compared to Surface NTC. If the Liquid NTC rise $\Delta T < 100°$ C. (or alternative value programmed at time of manufacture or set by user) after the 5 second heating period, for example, then it is determined that the appliance is not attempting to "dry boil". If dry boiling is detected (see STEP 3), the controller switches off the appliance or places it in standby mode.

STEP 3: After the 5 second sample, calculate an approximate amount of liquid in the appliance. The equation used by the controller is $\Delta T \cdot m \cdot C.° = P \cdot t$ where $\Delta T$ is the gradient temperature (the small gradient from room temperature up to 5 seconds, in this example), m is the mass of water, C.° is a constant, P is the applied power to the heating element and t is the time used to initially apply power to the main heater (in this example, 5 seconds). Thus, rearranging the equation, m can be calculated. If m is determined by the controller to be below a defined threshold value, the controller switches the appliance to standby mode and displays a warning message on the UI. Otherwise, step 4 is initiated including the calculations below.

The controller calculates the temperature rise $\Delta T$, further derives the approximate water content inside the appliance, and then the approximate time Tc to boil. The end desired temperature is known, as is the initial room temperature and the $\Delta T$ during the 5 second period. Thus, the desired temperature minus $\Delta T$ during the 5 second period, minus room temperature, gives $\Delta T$ for the final temperature. Therefore the equation can be rearranged for a time to boil calculation, in addition to detection of boiling by the liquid NTC. This ensures a backup in case the NTC fails or is inaccurate.

STEP 4: If the controller 165 determines that there is sufficient liquid in the appliance, or conversely determines that there is not insufficient liquid in the appliance, the controller switches 100% of available mains power to the main heater 167.

STEP 5: The controller 165 switches 100% of the available power in the energy storage device to the hybrid heater 169.

STEP 6: While both heaters (167, 169) are operating, the controller 165 continuously monitors the temperature of liquid NTC provided by the liquid temperature sensor 157.

STEP 7: If the controller determines that the liquid NTC reading has reached the defined desired temperature, or determines that the liquid NTC temperature reading has not increased for a defined period of time, e.g. 5 seconds, the controller 165 stops power being applied to both heaters (167, 169). The check to determine whether the temperature has not increased for a defined period of time is made to determine whether the temperature of the liquid has saturated, i.e. reached a peak dependent on the liquid and environmental conditions, and so subsequently stopped the heating process. For example, at higher altitudes, the temperature of water may never reach 100 degrees Celsius and may boil, for example, at 98 degrees Celsius.

The controller therefore control the amount of the mains power being applied to the main heater based on a determination of whether the sensed liquid temperature has reached a defined threshold temperature. Also, as an alternative, the controller controls the amount of the mains power being applied to the main heater based on a determination of whether the sensed liquid temperature has not increased for a defined period of time.

STEP 8: After completion of step 7, the controller turns off the power being applied to the main heater and the hybrid heater.

Figure 8:
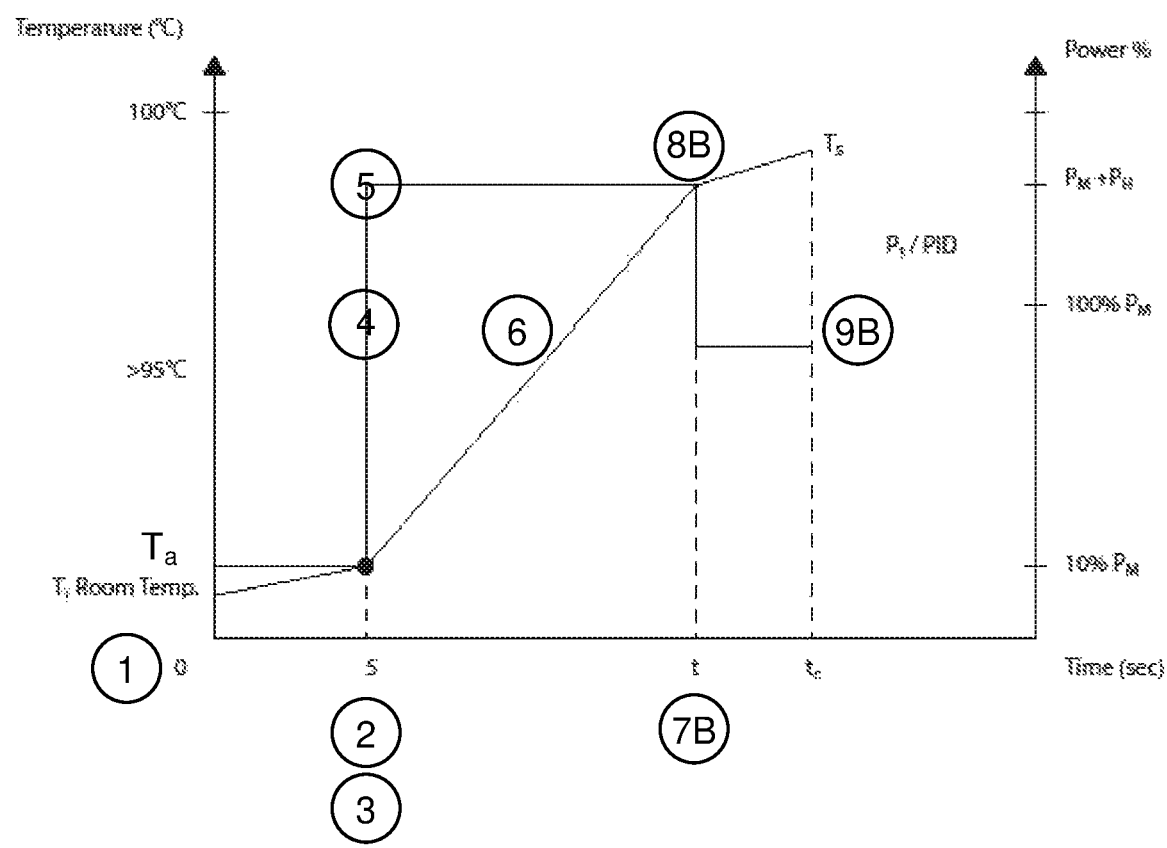
FIG. 8 shows an alternative heating process profile according to an example in the present disclosure.

FIG. 8 shows a heating process profile termed "Fast and Precise" that is used by the controller when this mode of operation is selected by a user at step 613 in the process shown in FIG. 6. This process is more accurate at reaching a desired (target) temperature as less power is applied closer to the desired temperature, and so there is less chance of overshooting the desired temperature during the heating process. For example, this mode may be desirable when a user wishes to heat water up to a temperature less than 100 degrees Celsius.

According to this process, steps 1-6 as described above with reference to the "Fast to Boil" mode described with reference to FIG. 7 are also executed by the controller in this "Fast and Precise" mode.

Steps 7 and 8 of the "Fast to Boil" mode are replaced with the following 3 steps 7B, 8B and 9B and are shown in FIG. 8 as references in circles.

STEP 7B: An equation is used for time calculation to keep applying a percentage of heat from the heating element;

$$t = t_c - 10 = \frac{(T_s - T_a)P_m}{2(T_a - T_i)(P_m + P_h)} - 10.$$

Where $T_s$ is the end desired temperature, $T_a$ is the temperature after step 3 (in this example 5 seconds), $T_i$ is the initial temperature (ambient/initial temperature), $P_m$ is the main heater wattage and $P_h$ is the hybrid heater wattage, $t_c$ is the calculated time to boil.

$$t = t_c - 10 = \frac{(T_s - T_a)P_m}{2(\Delta T)(P_m + P_h)} - 10.$$

STEP 8B: The hybrid heater is switched off by the controller at time (t)=$t_c$−10. It will be understood that at this stage the main heater power that is applied may be 100% of available power or less than 100% of available power to enable the desired temperature to be reached precisely. The amount of power for the main heater will depend on, at least, the desired temperature and the temperature the water has reached when the hybrid power is turned off.

STEP 9B: The main heater is switched off by the controller when the set temperature with an applied offset is reached. The offset may, for example, be 5 degrees Celsius. It will be understood that the offset value is preprogramed into the appliance at the time of manufacture and that the offset value may be any other suitable value.

Figure 9:
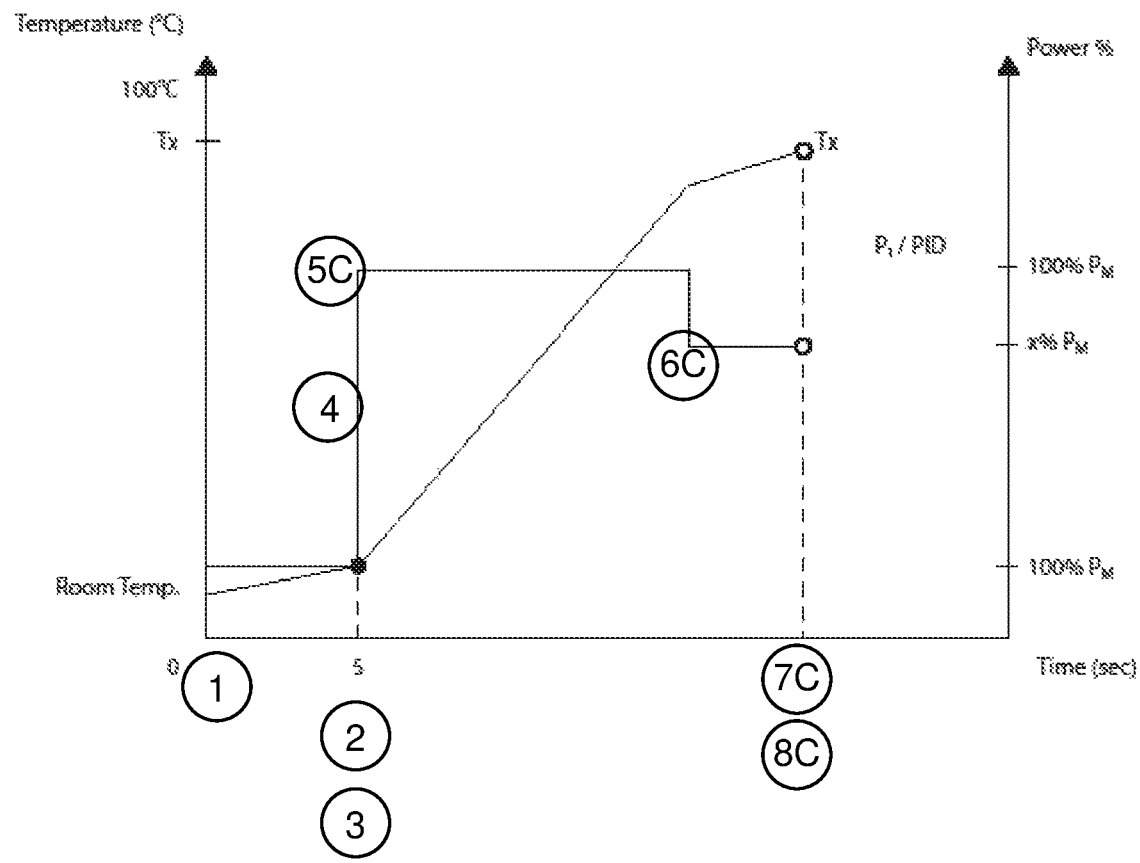
FIG. 9 shows a further alternative process profile according to an example in the present disclosure.

FIG. 9 shows a process profile termed "Standard Boil" that is used by the controller when this mode of operation is selected by a user at step 613 in the process shown in FIG. 6.

According to this process, only the main heater 167 is heated up. Steps 1-4 as described above with reference to the "Fast to Boil" mode are executed by the controller in this "Standard Boil" mode.

New steps 5C, 6C, 7C and 8C are implemented to replace steps 5 to 8 described above in relation to the "Fast to Boil" mode.

STEP 5C: the controller 165 applies 100% mains power to the main heater until a set temperature with an applied offset is reached. The offset may, for example, be 5 degrees Celsius. It will be understood that the offset value is preprogramed into the appliance at the time of manufacture and that the offset value may be any other suitable value.

STEP 6C: After step 5C, the controller 165 applies a reduced amount of power to the main heater. For example, a 60% of available power is applied to the main heater to enable the heater to heat the liquid so it reaches the predetermined (e.g. selected) temperature.

STEP 7C: If the controller 165 determines that the liquid NTC reading has reached the defined desired temperature, or determines that the liquid NTC temperature reading has not increased for a defined period of time, e.g. 5 seconds, the controller 165 stops power being applied to the main heater 167.

STEP 8C: The controller 165 stops power being applied to the main heater.

In terms of priority of operations for power control by the controller, the following hierarchy is provided as one example. The system operational priority for determining how power is to be applied to the heaters may be, for example (in order of highest priority first) i) dry boiling determination using an E-fast signal detection, ii) determining whether the energy storage device is charged, iii) determining whether a measured surface heater temperature (Surface NTC) has reached a threshold surface heater temperature and iv) determining whether a measured liquid temperature (Liquid NTC) has reached a threshold liquid temperature.

In terms of controlling the conditions for charging or using the energy storage device using the controller, the following hierarchy is provided as one example. The operational priority to be applied, for example, (in order of highest priority first) is i) overheating prevention by measuring whether the heater is within a defined temperature range using the measured surface heater temperature (Surface NTC), ii) avoiding complete discharge of the energy storage device by stopping the energy storage device from supplying power to the hybrid heater upon detection that the charge level is below a defined depletion threshold, and iii) avoiding overcharging the energy storage device by stopping the charging of the energy storage device upon detection that the charge level has reached a defined maximum charge threshold.

INDUSTRIAL APPLICABILITY

The arrangements described are applicable to liquid heating appliance industries and particularly for industries that manufacture liquid heating appliances for making a beverage.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The following CLAUSES define further aspects of embodiments of the invention:

CLAUSE 1: A liquid heating appliance for making a beverage, the liquid heating appliance comprising a plurality of heating components for heating a liquid, where at least a first of the plurality of heating components is powered using mains power, a power management system, wherein the power management system comprises: a controller, and an energy storage device, wherein the controller is arranged to control an amount of the mains power applied to the first of the plurality of heating components, and further arranged to control an amount of stored power from the energy storage device to be applied to at least a second of the plurality of heating components.

CLAUSE 2: The liquid heating appliance of clause 1, wherein the controller is arranged, during a first mode of operation, to enable the energy storage device to be charged from the mains power, and, during a second mode of operation, enable the energy storage device to apply the stored power to the at least second of the plurality of heating components.

CLAUSE 3: The liquid heating appliance of clause 2, wherein, in the second mode, the controller is further arranged to determine whether the amount of power stored in the energy storage device is above a defined threshold value, and upon a positive determination, enable the energy storage device to apply the stored power to the at least second of the plurality of heating components.

CLAUSE 4: The liquid heating appliance of clause 1, further comprising an inverter and a power regulator, wherein the inverter is arranged to convert a direct current power output from the energy storage device into an alternating current power output, and the power regulator is arranged to regulate how much power of the alternating current power output is applied to the at least second of the plurality of heating components.

CLAUSE 5: The liquid heating appliance of clause 1, wherein the liquid heating appliance has two heating components, wherein the two heating components are interleaved with each other.

CLAUSE 6: The liquid heating appliance of clause 1, wherein the energy storage device comprises at least one of a capacitor, a capacitor bank, a super capacitor, a super capacitor bank, or a battery.

CLAUSE 7: The liquid heating appliance of clause 1 further comprising a liquid temperature sensor, wherein the liquid temperature sensor is arranged to sense a temperature of the liquid being heated by the liquid heating appliance, wherein the controller is further arranged to control the amount of power being applied to at least one of the plurality of heating components based on the sensed liquid temperature.

CLAUSE 8: The liquid heating appliance of clause 7, wherein the controller is further arranged to control the amount of the mains power applied to the first heating component based on the temperature of the liquid.

CLAUSE 9: The liquid heating appliance of clause 8, wherein the controller is further arranged to control the amount of the mains power applied to the first heating component based on i) a determination of whether the sensed liquid temperature has reached a defined threshold temperature or ii) a determination that the sensed liquid temperature has not increased for a defined period of time.

CLAUSE 10: A power management system for use in a liquid heating appliance for making a beverage, wherein the liquid heating appliance has a plurality of heating components for heating a liquid, the power management system comprising: a controller, and an energy storage device, wherein the controller is arranged to control an amount of mains power applied to a first of the plurality of heating components, and further arranged to control an amount of power from the energy storage device to be applied to at least a second of the plurality of heating components.

CLAUSE 11: The power management system of clause 10, wherein the controller is arranged, during a first mode of operation, to enable the energy storage device to be charged from the mains power, and, during a second mode of operation, enable the energy storage device to apply the stored power to the at least second of the plurality of heating components.

CLAUSE 12: The power management system of clause 11, wherein, in the second mode, the controller is further arranged to determine whether the amount of power stored in the energy storage device is above a defined threshold value, and upon a positive determination, enable the energy storage device to apply the stored power to the at least second of the plurality of heating components.

CLAUSE 13: The power management system of clause 10, further comprising an inverter and a power regulator, wherein the inverter is arranged to convert a direct current power output from the energy storage device into an alternating current power output, and the power regulator is arranged to regulate how much power of the alternating current power output is applied to the at least second of the plurality of heating components.

CLAUSE 14: The power management system of clause 10, wherein the energy storage device comprises at least one of a capacitor, a capacitor bank, a super capacitor, a super capacitor bank, or a battery.

CLAUSE 15: The power management system of clause 10, wherein the controller is further arranged to control the amount of the mains power applied to the first heating component based on a temperature of liquid in the liquid heating appliance.

CLAUSE 16: The power management system of clause 10, wherein the controller is further arranged to control the amount of the mains power applied to the first heating component based on i) a determination of whether a sensed liquid temperature has reached a defined threshold temperature or ii) a determination that the sensed liquid temperature has not increased for a defined period of time.

CLAUSE 17: A method of controlling the provision of power in a liquid heating appliance for making a beverage, the method comprising the steps of: controlling an amount of mains power being applied to a first of a plurality of heating components in the liquid heating appliance, and controlling an amount of stored power in an energy storage device integrated with the liquid heating appliance being applied to at least a second of the plurality of heating components.

CLAUSE 18: The method of clause 17, further comprising the steps of, during a first mode of operation, enabling the energy storage device to be charged from the mains power, and, during a second mode of operation, enabling the energy storage device to apply the stored power to the at least second of the plurality of heating components.

CLAUSE 19: The method of clause 18, further comprising the steps of, when in the second mode, determining whether the amount of power stored in the energy storage device is above a defined threshold value, and upon a positive determination, enabling the energy storage device to apply the stored power to the at least second of the plurality of heating components.

CLAUSE 20: The method of clause 17, further comprising the steps of converting a direct current power output from the energy storage device into an alternating current power output, and regulating how much power of the alternating current power output is applied to the at least second of the plurality of heating components.

CLAUSE 21: The method of clause 17 further comprising the steps of sensing a temperature of the liquid being heated by the liquid heating appliance, and controlling the amount of power being applied to at least one of the plurality of heating components based on the sensed liquid temperature.

CLAUSE 22: The method of clause 21, further comprising the step of controlling the amount of the mains power applied to the first heating component based on the temperature of the liquid.

CLAUSE 23: The method of clause 22, further comprising the step of controlling the amount of the mains power applied to the first heating component based on i) a determination of whether the sensed liquid temperature has reached a defined threshold temperature or ii) a determination that the sensed liquid temperature has not increased for a defined period of time.

CLAUSE 24: A microcontroller readable medium, having a program recorded thereon, where the program is configured to make a microcontroller execute a procedure to control an amount of mains power being applied to a first of a plurality of heating components in a liquid heating appliance, and control an amount of stored power in an energy storage device integrated with the liquid heating appliance being applied to at least a second of the plurality of heating components.

CLAUSE 25: The microcontroller readable medium of clause 24, where the program is configured to make a microcontroller execute a procedure to, during a first mode of operation, enable the energy storage device to be charged from the mains power, and, during a second mode of operation, enable the energy storage device to apply the stored power to the at least second of the plurality of heating components.

CLAUSE 26: The microcontroller readable medium of clause 25, where the program is configured to make a microcontroller execute a procedure to, in the second mode, determine whether the amount of power stored in the energy storage device is above a defined threshold value, and upon a positive determination, enable the energy storage device to apply the stored power to the at least second of the plurality of heating components.

CLAUSE 27: The microcontroller readable medium of clause 24, where the program is configured to make a microcontroller execute a procedure to control the amount of the mains power applied to the first heating component based on a temperature of liquid in the liquid heating appliance.

CLAUSE 28: The microcontroller readable medium of clause 24, where the program is configured to make a microcontroller execute a procedure to control the amount of the mains power applied to the first heating component based on i) a determination of whether a sensed liquid temperature has reached a defined threshold temperature or ii) a determination that the sensed liquid temperature has not increased for a defined period of time.

CLAUSE 29: A liquid heating appliance for making a beverage, the liquid heating appliance comprising: a plurality of heating components for heating a liquid, where at least a first of the plurality of heating components is powered using mains power, a power management system, wherein the power management system comprises: a controller, an energy storage device, and a switching component, wherein the controller is arranged to: control an amount of the mains power applied to the first of the plurality of heating components, and control an amount of stored power from the energy storage device to be applied to at least a second of the plurality of heating components, wherein the switching component is arranged to: convert the stored power from the energy storage device into alternating current.

CLAUSE 30: The liquid heating appliance of clause 29, wherein the switching component is arranged to convert the stored power from the energy storage device into alternating current that is 180 degrees out of phase with respect to the mains power being applied to the first of the plurality of heating components.

CLAUSE 31: The liquid heating appliance of clause 29, wherein the switching component is an inverter, a solid-state relay or a triac.

CLAUSE 32: The liquid heating appliance of clause 29, wherein the alternating current may be a sinusoidal alternating current or may be a square wave alternating current.

CLAUSE 33: A power management system for use in a liquid heating appliance for making a beverage, wherein the liquid heating appliance has a plurality of heating components for heating a liquid, the power management system comprising: a controller, an energy storage device, and a switching component, wherein the controller is arranged to: control an amount of the mains power applied to the first of the plurality of heating components, and control an amount of stored power from the energy storage device to be applied to at least a second of the plurality of heating components, wherein the switching component is arranged to: convert the stored power from the energy storage device into alternating current that is out of phase with respect to the mains power being applied to the first of the plurality of heating components.

CLAUSE 34: The power management system of clause 33, wherein the switching component is arranged to convert the stored power from the energy storage device into alternating current that is 180 degrees out of phase with respect to the mains power being applied to the first of the plurality of heating components.

CLAUSE 35: The power management system of clause 33, wherein the switching component may be an inverter, a solid-state relay or a triac.

CLAUSE 36: The power management system of clause 33, wherein the alternating current may be a sinusoidal alternating current, or may be a square wave alternating current.

CLAUSE 37: A method of controlling the provision of power in a liquid heating appliance for making a beverage, the method comprising the steps of: controlling an amount of mains power being applied to a first of a plurality of heating components in the liquid heating appliance, controlling an amount of stored power in an energy storage device integrated with the liquid heating appliance being applied to at least a second of the plurality of heating components, and converting the stored power from the energy storage device into alternating current that is out of phase with respect to the mains power being applied to the first of the plurality of heating components.

CLAUSE 38: The method of clause 37, wherein the method further comprises the step of converting the stored power from the energy storage device into alternating current that is 180 degrees out of phase with respect to the mains power being applied to the first of the plurality of heating components.

CLAUSE 39: The method of clause 37, wherein the switching component is an inverter, a solid-state relay or a triac.

CLAUSE 40: The method of clause 37, wherein the alternating current is a sinusoidal alternating current or may be a square wave alternating current.

CLAUSE 41: A microcontroller readable medium, having a program recorded thereon, where the program is configured to make a microcontroller execute a procedure to control an amount of mains power being applied to a first of a plurality of heating components in a liquid heating appliance, control an amount of stored power in an energy storage device integrated with the liquid heating appliance being applied to at least a second of the plurality of heating components, and convert the stored power from the energy storage device into alternating current that is out of phase with respect to the mains power being applied to the first of the plurality of heating components.

CLAUSE 42: The microcontroller readable medium of clause 41, wherein the switching component is arranged to convert the stored power from the energy storage device into alternating current that is 180 degrees out of phase with respect to the mains power being applied to the first of the plurality of heating components.

CLAUSE 43: The microcontroller readable medium of clause 41, wherein the switching component is an inverter, a solid-state relay or a triac.

CLAUSE 44: The microcontroller readable medium of clause 41, wherein the alternating current is a sinusoidal alternating current or may be a square wave alternating current.

The invention claimed is:
1. A liquid heating appliance for making a beverage, the liquid heating appliance comprising:

a plurality of heating components, where at least a first of the plurality of heating components is powered using mains power, a power management system, wherein the power management system comprises:

a controller, and an energy storage device, wherein the controller is arranged to:

control an amount of the mains power applied to the first of the plurality of heating components, control an amount of stored power from the energy storage device to be applied to at least a second of the plurality of heating components, and switch polarity of the voltage of the stored power from the energy storage device to be applied to the second of the plurality of heating components after one or more heating cycles associated with the second of the plurality of heating components, where the controller is arranged to switch polarity of the voltage of the stored power from the energy storage device by controlling a duty cycle of switching devices arranged to switch the polarity of the voltage of the stored power.

2. The liquid heating appliance of claim 1, wherein the controller is arranged to switch polarity of the voltage of the stored power from the energy storage device after each heating cycle associated with the second of the plurality of heating components.

3. The liquid heating appliance of claim 1, wherein the controller is arranged to switch polarity of the voltage of the stored power from the energy storage device after a defined period of time.

4. The liquid heating appliance of claim 1, wherein the controller is further arranged to delay switching on or off two or more of the plurality of heating components in a defined sequence.

5. The liquid heating appliance of claim 1, wherein the stored power to be applied to the second of the plurality of heating components is DC power.

6. The liquid heating appliance of claim 1, wherein the controller is arranged to switch polarity of the voltage of the stored power from the energy storage device after two, three or more heating cycles associated with the second of the plurality of heating components.

7. A power management system for use in a liquid heating appliance for making a beverage, wherein the liquid heating appliance has a plurality of heating components, the power management system comprising:

a controller, and an energy storage device, wherein the controller is arranged to:

control an amount of the mains power applied to the first of the plurality of heating components, control an amount of stored power from the energy storage device to be applied to at least a second of the plurality of heating components, and switch polarity of the voltage of the stored power from the energy storage device to be applied to the second of the plurality of heating components after one or more heating cycles associated with the second of the plurality of heating components, where the controller is arranged to switch polarity of the voltage of the stored power from the energy storage device by controlling a duty cycle of switching devices arranged to switch the polarity of the voltage of the stored power.

8. The power management system of claim 7, wherein the controller is arranged to switch polarity of the voltage of the stored power from the energy storage device after each heating cycle associated with the second of the plurality of heating components.

9. The power management system of claim 7, wherein the controller is arranged to switch polarity of the voltage of the stored power from the energy storage device after a defined period of time.

10. The power management system of claim 7, wherein the stored power to be applied to the second of the plurality of heating components is DC power.

11. The power management system of claim 7, wherein the controller is arranged to switch polarity of the voltage of the stored power from the energy storage device after two, three or more heating cycles associated with the second plurality of heating components.

12. A method of controlling the provision of power in the liquid heating appliance according to claim 1, the method comprising:

controlling the amount of mains power being applied to the first of the plurality of heating components in the liquid heating appliance, controlling the amount of stored power in the energy storage device integrated with the liquid heating appliance being applied to at least the second of the plurality of heating components, and switching polarity of the voltage of the stored power from the energy storage device to be applied to the second of the plurality of heating components after one or more heating cycles associated with the second of the plurality of heating components, wherein the switching polarity of the voltage of the stored power from the energy storage is performed by controlling the duty cycle of the switching devices arranged to switch the polarity of the voltage of the stored power.

13. The method of claim 12 further comprising switching polarity of the voltage of the stored power from the energy storage device after each heating cycle associated with the second of the plurality of heating components.

14. The method of claim 12 further comprising switching polarity of the voltage of the stored power from the energy storage device after a defined period of time.

15. The method of claim 12, further comprising delaying switching on and/or off two or more of the plurality of heating components in a defined sequence.

16. The method of claim 12, wherein the stored power to be applied to the second of the plurality of heating components is DC power.

17. The method of claim 12, further comprising switching polarity of the voltage of the stored power from the energy storage device after two, three or more heating cycles associated with the second of the plurality of heating components.

* * * * *